(12) United States Patent
Gutierrez

(10) Patent No.: US 9,426,344 B2
(45) Date of Patent: Aug. 23, 2016

(54) CAMERA MODULES WITH INERTIAL SENSORS

(71) Applicant: DigitalOptics Corporation MEMS, Arcadia, CA (US)

(72) Inventor: Roman C. Gutierrez, Arcadia, CA (US)

(73) Assignee: DIGITALOPTICS CORPORATION MEMS, Arcadia, CA (US)

( * ) Notice: Subject to any disclaimer, the term of this patent is extended or adjusted under 35 U.S.C. 154(b) by 645 days.

(21) Appl. No.: 13/840,576

(22) Filed: Mar. 15, 2013

(65) Prior Publication Data

US 2013/0201392 A1 Aug. 8, 2013

Related U.S. Application Data

(63) Continuation-in-part of application No. 12/946,515, filed on Nov. 15, 2010, now Pat. No. 8,619,378, and a continuation-in-part of application No. 13/247,898, filed on Sep. 28, 2011, now Pat. No. 8,768,157.

(60) Provisional application No. 61/622,480, filed on Apr. 10, 2012.

(51) Int. Cl.
*G02B 7/02* (2006.01)
*H04N 5/225* (2006.01)
*G03B 3/10* (2006.01)
*G02B 7/10* (2006.01)
*G02B 27/64* (2006.01)

(52) U.S. Cl.
CPC ............. *H04N 5/2254* (2013.01); *G02B 7/102* (2013.01); *G02B 27/646* (2013.01); *G03B 3/10* (2013.01); *G03B 2205/0061* (2013.01)

(58) Field of Classification Search
CPC .......... H04N 5/23264; H04N 5/23251; G02B 27/646; G02B 13/001; G02B 7/04; G02B 27/648; G02B 7/102; G03B 5/00; G03B 2205/0015; G03B 2205/0069; G03B 17/00; G03B 2205/0023; G03B 2205/0053; G03B 2205/0061; G03B 2217/005
USPC .................................................. 359/823, 819
See application file for complete search history.

(56) References Cited

U.S. PATENT DOCUMENTS

| 2006/0280500 | A1* | 12/2006 | Chen | H04N 5/2257 396/535 |
|---|---|---|---|---|
| 2009/0255336 | A1* | 10/2009 | Horning | G01C 19/5719 73/504.12 |
| 2012/0113280 | A1* | 5/2012 | Stupak | G03B 5/00 348/208.99 |

* cited by examiner

*Primary Examiner* — Alicia M Harrington
(74) *Attorney, Agent, or Firm* — Haynes and Boone, LLP

(57) ABSTRACT

A camera module includes an actuator that is coupled to one or more lenses of an optical train configured to move relative to an image sensor to provide alignment, zoom and/or autofocus control. The actuator is configured to position one or more, e.g., three, lenses of the optical train by applying one or more bias voltages respectively between one or more pairs of actuator components. A processor uses measured capacitances of the pairs of actuator components and/or the bias voltages thereof to calculate an acceleration or force acting on the camera module and to provide information for the actuator to align the optical train along the optical path in accordance with the information.

26 Claims, 32 Drawing Sheets

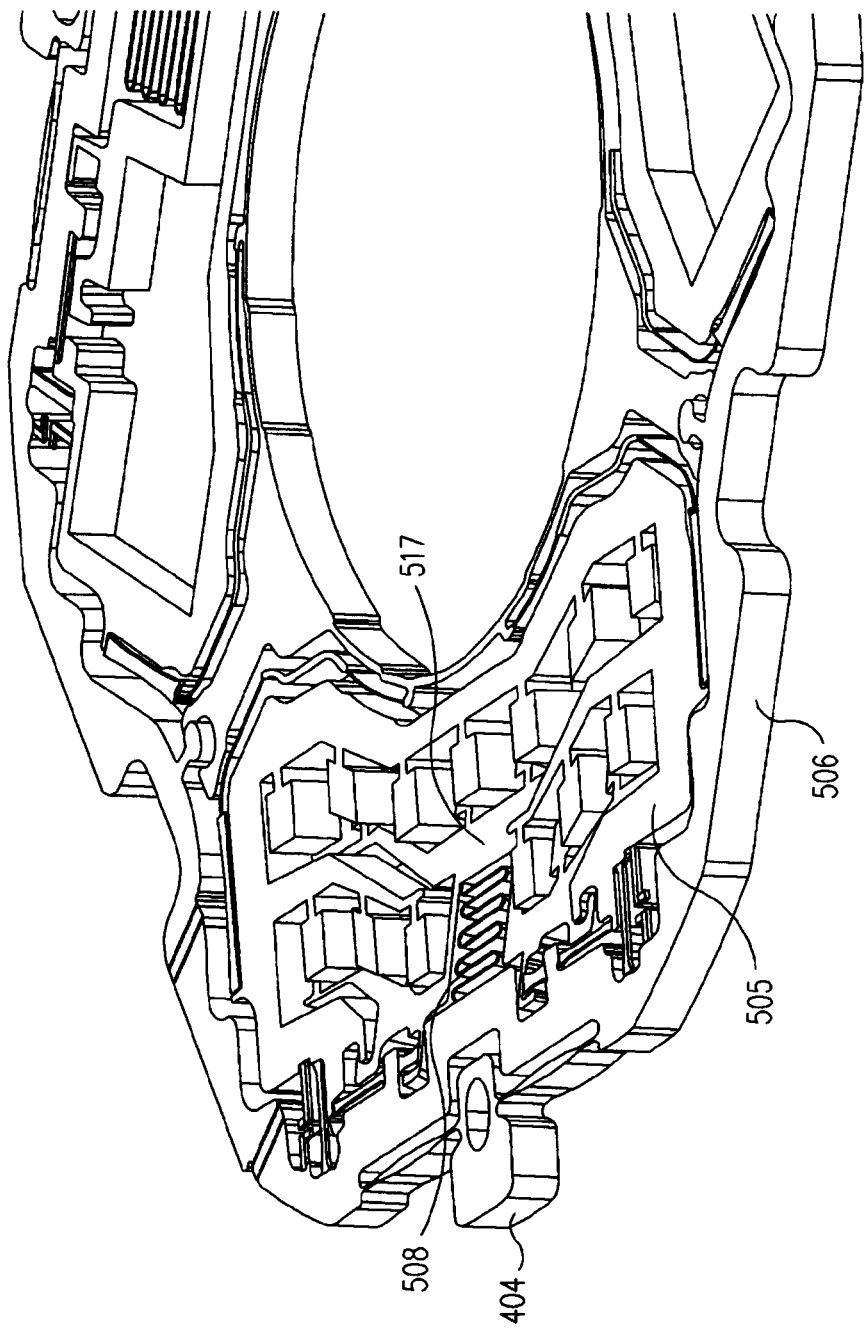

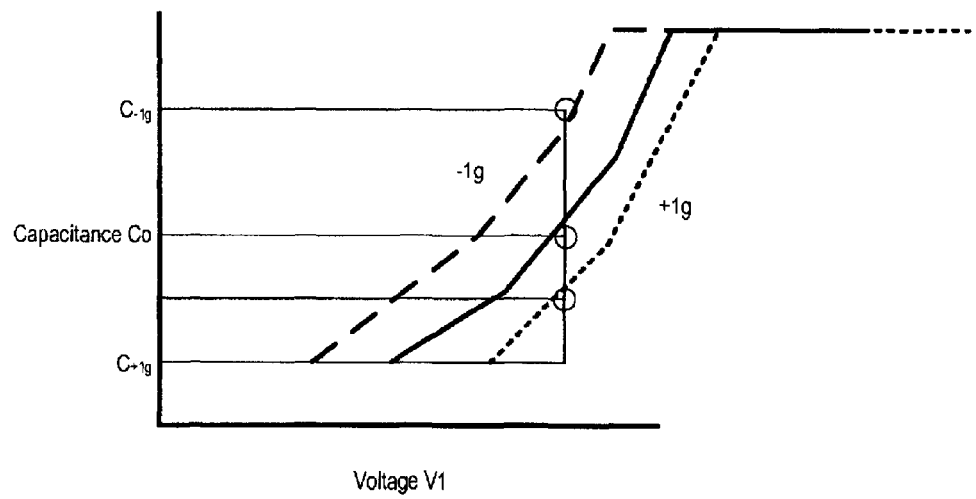
FIG. 21
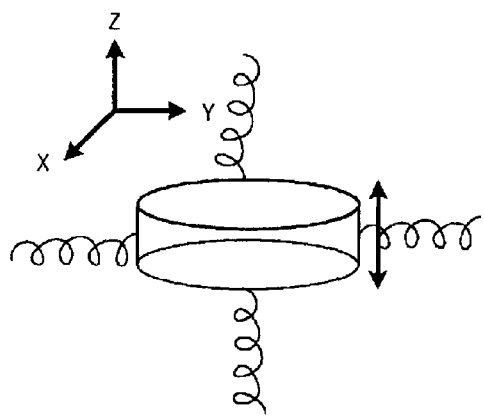 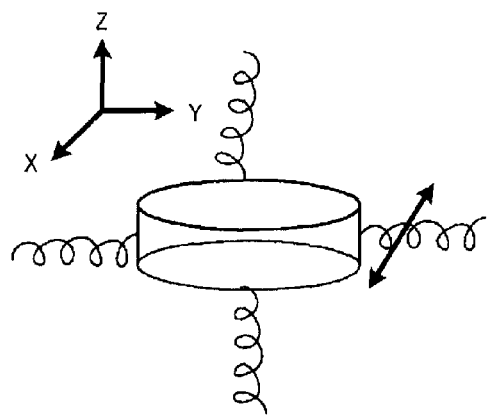
FIG. 22A  FIG. 22B

CAMERA MODULES WITH INERTIAL SENSORS

RELATED APPLICATIONS

This Continuation-In-Part Patent Application claims the benefit of and priority to U.S. Provisional Patent Application No. 61/622,480, filed Apr. 10, 2012, U.S. patent application Ser. No. 12/946,515, filed Nov. 15, 2010, now U.S. Pat. No. 8,619,378, issued Dec. 31, 2013, and U.S. patent application Ser. No. 13/247,898, filed Sep. 28, 2011, now U.S. Pat. No. 8,768,157, issued Jul. 1, 2014, the entire disclosure of each of which is incorporated herein by reference.

BACKGROUND

1. Technical Field

One or more embodiments of the invention relate to camera modules, and particularly, for example, to a camera module having inertial sensing, such as via one or more accelerometers and/or gyroscopes.

2. Related Art

Actuators for use in miniature cameras and other devices are well known. Such actuators typically comprise voice coils that are used to move a lens for focusing, zooming, or optical image stabilization.

Microelectromechanical systems (MEMS) actuators are also well known. Examples of MEMS actuators include comb drives, scratch drives, and thermal drives. MEMS actuators can be made using integrated circuit (IC) fabrication techniques. MEMS actuators can be used in a variety of applications. For example, MEMS drives can be used move a lens so as to facilitate the focusing of a miniature camera. Accordingly, it would be beneficial to provide improved MEMS drives for such applications.

Miniature cameras can be used in a variety of different electronic devices. For example, miniature cameras are commonly used in cellular telephones, laptop computers, and surveillance devices and in many other applications. As the size of electronic devices continues to be reduced, the size of miniature cameras that are part of such devices must typically be reduced as well. In light of this, it becomes desirable to provide ways of reducing the size of miniature cameras.

As the size of miniature cameras is reduced, smaller, more delicate components must often be utilized in their construction. Since such consumer products are typically subject to substantial abuse, such as rough handling and dropping, the components of miniature cameras must be protected from the shock that is associated with such abuse.

Additionally, a need exists for providing miniature cameras with additional functionalities, for example, inertial sensing functions useful for, e.g., image stabilization.

SUMMARY

In accordance with an embodiment of the present invention, miniature camera modules are provided, together with methods for making and using them, that are smaller, more rugged, yet which incorporate more enhanced functionalities, than miniature camera modules of the prior art.

In accordance with an embodiment, cameras can be provided with inertial sensors. The cameras can have microelectromechanical systems (MEMS) components. The inertial sensors can include accelerometers and gyroscopes. The inertial sensors can have MEMS components. The inertial sensors can take advantage of existing components of a camera, such as by using moving components thereof as masses that define, at least in part, the inertial sensors.

In accordance with one example embodiment, a camera module includes an actuator that is coupled to one or more lenses of an optical train that is configured to move relative to the image sensor to provide alignment, zoom and/or autofocus control. The actuator is configured to position one or more, e.g., three, lenses of the optical train by applying one or more bias voltages respectively between one or more pairs of actuator components. An associated processor uses measured capacitance(s) of the pairs of actuator components, and the bias voltage(s), to calculate an acceleration or force acting on the camera module and to provide information accordingly for the actuator to align the optical train along the optical path.

The scope of the present disclosure is defined by the claims appended hereafter, which are incorporated into this section by reference. A more complete understanding of the features and advantages of the novel miniature camera modules of the disclosure and the methods for making and using them will be afforded to those skilled in the art by a consideration of the detailed description of some example embodiments thereof presented below, particularly if such consideration is made in conjunction with the appended drawings, briefly described below, wherein like reference numerals are used to identify like elements illustrated in one or more of the figures thereof.

BRIEF DESCRIPTION OF THE SEVERAL VIEWS OF THE DRAWINGS

FIG. 9B is a partial top and side perspective view of the actuator device in a deployed configuration, with a small actuation voltage being applied thereto.

FIG. 21 is a graph showing three plots of a measured capacitance between adjacent comb drive actuator teeth of an electrostatic actuator device as a function of a bias voltage applied to the teeth and an ambient gravity field acting on the device for each of a neutral gravity field, a positive gravity field, and negative gravity field.

FIG. 22A is a schematic illustration of a lens mounted on and being vibrated by an actuator device along a z-axis disposed parallel to an optical axis of the lens by the actuator device to generate an inertial frame and thereby effect a gyroscopic function in accordance with certain embodiments.

FIG. 22B is a schematic illustration of a lens mounted on and being vibrated by an actuator device along an x and/or a y axis disposed orthogonal to the optical axis of the lens to generate an inertial frame and thereby effect a gyroscopic function in accordance with certain embodiments.

DETAILED DESCRIPTION

Figure 1:
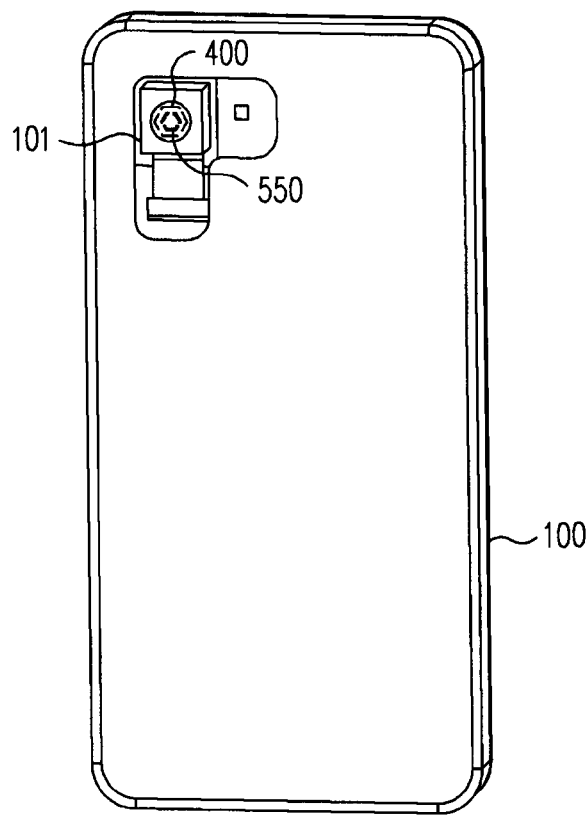
FIG. 1 is a front and side perspective view of an electronic device having an example embodiment of a miniature camera module, in accordance with the present invention.

In accordance with the present invention, various embodiments of actuator devices suitable for use in a wide variety of different electronic devices are disclosed. The actuator devices can be adapted for use in a camera, such as a miniature camera, for example. The actuator devices can be used to focus the miniature camera either manually or automatically. The actuator devices can also be used to zoom the miniature camera or to provide optical image stabilization for the miniature camera. The actuator devices can be used as inertial sensors for aligning the camera and/or optical elements within the camera. The actuator devices can be used for any other desired application in an electronic device or in any other device.

In accordance with one or more embodiments, inertial sensors, such as accelerometers and gyroscopes can provide inertial sensing for a camera or the like. The inertial sensing can be used for image stabilization. The inertial sensing can be used for any other desired purpose.

Although gyroscopes are typically used for image stabilization, according to one or more embodiments, accelerometers can be used for image stabilization. In accordance with one or more embodiments, any combination of accelerometers and gyroscopes can be used for image stabilization.

In accordance with one or more embodiments, the actuator devices can comprise one or more MEMS actuators. The actuator devices can be formed using monolithic construction. The actuator devices can be formed using non-monolithic construction. The inertial sensors can be used with MEMS cameras, MEMS actuators, and other MEMS devices, as well as non-MEMS devices.

The actuator devices can be formed using contemporary fabrication techniques, such as etching and micromachining, for example. Various other fabrication techniques are contemplated.

The actuator devices can be formed of silicon (e.g., single crystal silicon and/or polycrystalline silicon). The actuator devices can be formed of other semiconductors such as silicon, germanium, diamond, and gallium arsenide. The material of which the actuator devices are formed can be doped to obtain a desired conductivity thereof. The actuator devices can be formed of a metal such as tungsten, titanium, germanium, aluminum, or nickel. Any desired combination of such materials can be used.

Motion control of the actuator devices and/or items moved by the actuator devices is disclosed in accordance with various embodiments. The motion control can be used to facilitate a desired movement of an item while mitigating undesired movement of the item. For example, the motion control can be used to facilitate movement of a lens along an optical axis of the lens, while inhibiting other movements of the lens. Thus, the motion control can be used to facilitate movement of the lens in single desired translational degree of freedom while inhibiting movement of the lens in all other translational degrees of freedom and while inhibiting movement of the lens in all rotational degrees of freedom. In another example, the motion control can facilitate movement of the lens in all three translational degrees of freedom while inhibiting movement of the lens in all rotational degrees of freedom.

Thus, an enhanced miniature camera for standalone use and for use in electronic devices can be provided. The miniature camera is suitable for use in a wide variety of different electronic devices. For example, the miniature camera is suitable for use in electronic devices such as cellular telephones, laptop computers, televisions, handheld devices, and surveillance devices.

According to various embodiments, smaller size and enhanced shock resistance are provided. Enhanced fabrication techniques can be used to provide these and other advantages. Such fabrication techniques can additionally enhance the overall quality and reliability of miniature cameras while also substantially reducing the cost thereof.

FIG. 1 illustrates an electronic device 100 incorporating an example embodiment of an actuator device 400 in accordance with the present invention. As discussed herein, the actuator device 400 can have one or more actuators 550. In one embodiment, the actuators 550 can be MEMS actuators, such as electrostatic comb drive actuators. In one embodiment, the actuators 550 can be rotational comb drive actuators.

The electronic device 100 can have one or more actuators 550 for moving any desired component thereof. For example, the electronic device 100 can have an optical device, such as a miniature camera 101, that has the actuator 550 for moving optical elements, such as one or more movable lenses 301 (shown in FIG. 2) that are adapted to provide focus, zoom, and/or image stabilization. The electronic device 100 can have any desired number of the actuators 550 for performing any desired functions.

The electronic device 100 can be a cellular telephone, a laptop computer, a surveillance device, or any other desired device. The miniature camera 101 can be built into the electronic device 100, can be attached to the electronic device 100, or can be separate (e.g., remote) with respect to the electronic device 100.

Figure 2:
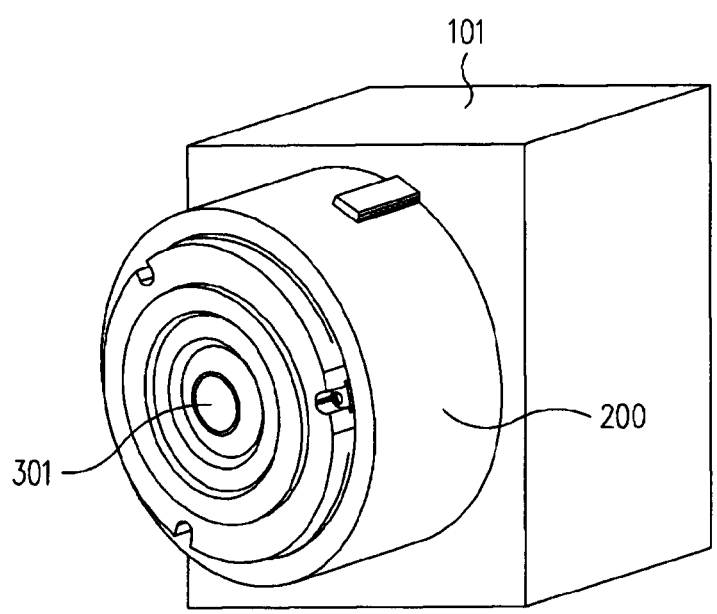
FIG. 2 is a front and side perspective view of the example miniature camera module of FIG. 1, showing an example lens barrel thereof.

FIG. 2 illustrates the miniature camera 101 having a lens barrel 200, in accordance with an embodiment. The lens barrel 200 can contain one or more optical elements, such as the movable lens 301, which can be moved by the actuator device 400 (shown in FIG. 1). The lens barrel 200 can have one or more optical elements which can be fixed. For example, the lens barrel 200 can contain one or more lenses, apertures (variable or fixed), shutters, mirrors (which can be flat, non-flat, powered, or non-powered), prisms, spatial light modulators, diffraction gratings, lasers, LEDs and/or detectors. Any of these items can be fixed or can be movable by the actuator device 400.

The actuator device 400 can move non-optical devices such as samples that are provided for scanning. The samples can be either biological samples or non-biological samples. Examples of biological samples include organisms, tissues, cells, and proteins. Examples of non-biological samples include solids, liquids, and gases. The actuator device 400 can be used to manipulate structures, light, sound, or any other desired thing.

The optical elements can be partially or fully contained within the lens barrel 200. The lens barrel 200 can have any desired shape, For example, the lens barrel 200 can be substantially round, triangular, rectangular, square, pentagonal, hexagonal, octagonal, or of any other shape or cross-sectional configuration. The lens barrel 200 can be either permanently or removably attached to the miniature camera 101. The lens barrel 200 can be defined by a portion of a housing of the miniature camera 101. The lens barrel 200 can be partially or completely disposed within the miniature camera 101.

Figure 3A:
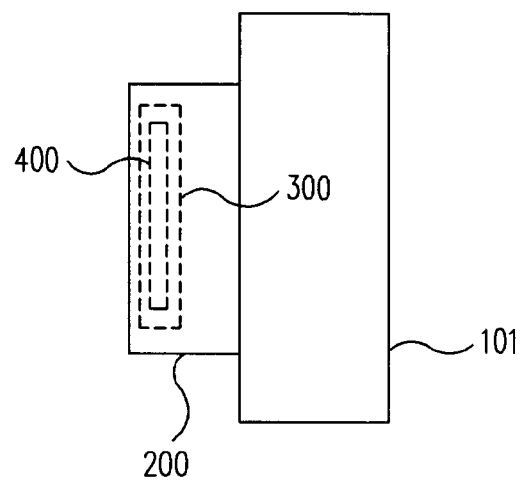
FIG. 3A is a top plan view of the example miniature camera module, showing an example actuator module incorporating an example actuator device therein.

FIG. 3A illustrates an actuator module 300 disposed within the lens barrel 200, in accordance with an embodiment. The actuator module 300 can contain the actuator device 400. The actuator device 400 can be completely contained within the lens barrel 200, partially contained within the lens barrel 200, or completely outside of the lens barrel 200. The actuator device 400 can be adapted to move optical elements contained within the lens barrel 200, optical elements not contained within the lens barrel 200, and/or any other desired items.

Figure 3B:
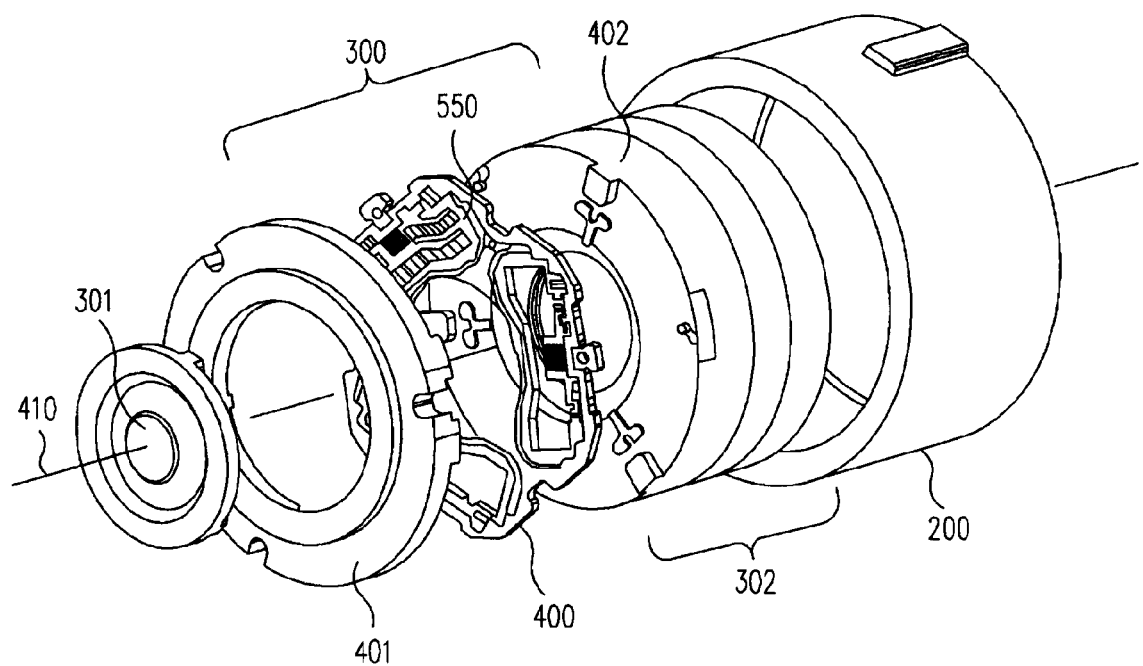
FIG. 3B is an exploded perspective view of the example lens barrel and actuator module.

FIG. 3B illustrates the lens barrel 200 and the actuator module 300 in an exploded view, in accordance with an embodiment. The movable lens 301 is an example of an optical element that can be attached to the actuator device 400 and can be moved thereby. The actuator device 400 can be disposed intermediate an upper module cover 401 and a lower module cover 402.

Additional optical elements, such as fixed (i.e., stationary) lenses 302 can be provided. The additional optical elements can facilitate focus, zoom, and/or optical image stabilization, for example. Any desired number and/or type of movable (such as via the actuator device 400) and fixed optical elements can be provided.

Figure 4:
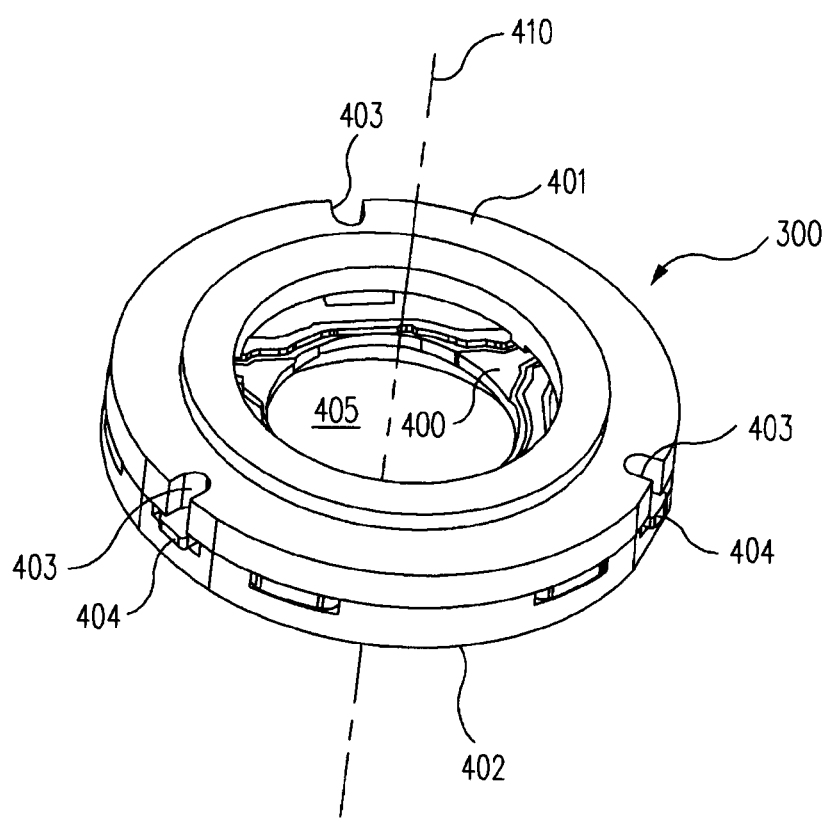
FIG. 4 is a front and side perspective view of the example actuator module incorporating the example actuator device.

FIG. 4 illustrates the actuator module 300, in accordance with an embodiment. The actuator module 300 can be disposed partially or completely within the miniature camera 101. The actuator device 400 can be disposed partially or completely within the actuator module 300. For example, the actuator device 400 can be sandwiched substantially between an upper module cover 401 and a lower module cover 402.

The actuator module 300 can have any desired shape. For example, the actuator module 300 can be substantially round, triangular, square, rectangular, pentagonal, hexagonal, octagonal, or of any other shape or cross-sectional configuration.

In one embodiment, the lens barrel 200 can be substantially round in cross-sectional configuration and the actuator module 300 can be substantially round in cross-sectional configuration. The use of a substantially round lens barrel 200 and a substantially round actuator module 300 can facilitate an advantageous reduction in size. The reduction in size can be facilitated, for example, because round lenses are commonly preferred. The use of a substantially round lens barrel 200 and a substantially round actuator module 300 with round lenses tends to result in a reduction of wasted volume and thus tends to facilitate a reduction in size.

As discussed herein, one or more optical elements, such as the movable lens 301, can be disposed in an opening 405 (e.g., a through hole) formed in the actuator module 300. Actuation of the actuators 550 can effect movement of the optical elements along their optical axis 410, for example. Thus, actuation of the actuators 550 can move one or more lenses to effect focusing or zoom, for example.

The actuator module 300 can have cutouts 403 formed therein to facilitate assembly of the actuator module 300 and alignment of the actuator device 400 contained therein. The cutouts 403 and/or electrical contacts 404 partially disposed within the cutouts 403 can be used to facilitate alignment of the actuator module 300 with respect to the lens barrel 200.

Figure 5A:
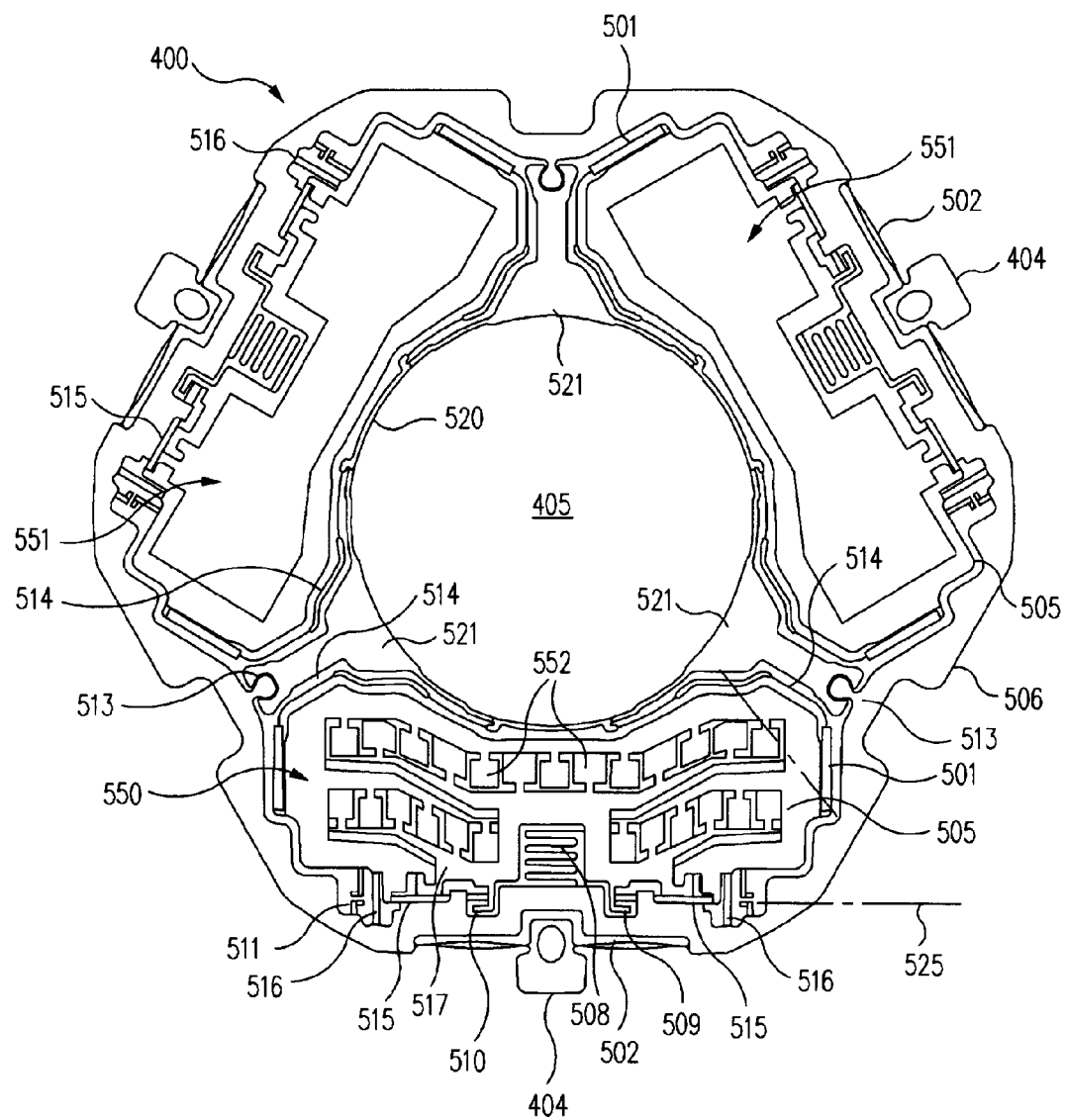
FIG. 5A is a top plan view of the example actuator device.

FIG. 5A illustrates a top view of the actuator device 400 having the electrical contacts 404, the opening 405, inner hinge flexures 501, kinematic mount flexures 502, movable frames 505, an outer frame 506, serpentine contact flexures 508, deployment torsional flexures 509, deployment stops 510, flap dampers 511, ball-in-socket snubbers 513, cantilever flexures 514, motion control torsional flexures 515, outer hinge flexures 516, a fixed frame 517, a platform 520, lens pads 521, a pivot axis 525, the actuators 550, spaces 551, and blocks 552, in accordance with an embodiment.

Blocks 552 (FIG. 5A) are shown to represent teeth 560 (see FIGS. 5B and 7) of the actuator 550 in some figures. Those skilled in the art will appreciate that comb drives typically comprise a large number of very small teeth 560 that are difficult to show graphically on a drawing of this scale. For example, the actuator 550 can have between 1 and 10,000 teeth on each side thereof and can have approximately 2,000 teeth on each side thereof. Thus, in one embodiment, the blocks 552 do not represent the actual configuration of the teeth 560, but rather, are shown in place of the teeth 560 to better illustrate the operation of the actuators 550, as discussed herein.

In accordance with an embodiment, the actuator device 400 can be substantially hexagonal in shape. The hexagonal shape readily facilitates placement of the actuator device 400 within the substantially round lens barrel 200. The hexagonal shape also facilitates efficient use of wafer real estate. Other shapes are contemplated.

The actuator device 400 can have a plurality of the actuators 550. Only one actuator 550 is illustrated in detail in FIG. 5A. The spaces 551 are shown in FIG. 5A for two additional actuators 550 that are not illustrated in detail. Thus, in one embodiment the actuator device 400 can have three actuators 550 disposed in a substantially radially symmetric pattern about the opening 405 such that the actuators 550 are spaced approximately 120° apart from one another. The actuator device 400 can have any desired number of the actuators 550 disposed in any desired pattern. As further examples, the actuator device 400 can have two actuators 550 spaced approximately 180° apart from one another or can have four actuators 550 spaced approximately 90° apart from one another.

As discussed herein, the actuators 550 can include one or more MEMS actuators, voice coil actuators, or any other desired type or combination of types of actuators. For example, in one embodiment, each actuator 550 can be a vertical rotational comb drive.

The actuators 550 can cooperate with one another to move a platform 520 along the optical axis 410 (FIG. 3B), which in FIG. 5A, is perpendicular to the plane of the actuator device 400. The actuators 550 can cooperate with one another to move the platform 520 in a manner that maintains the platform 520 substantially orthogonal with respect to the optical axis 410 and in a manner that substantially mitigates rotation of the platform 520.

Actuation of the actuators 550 is accomplished by the application of a voltage differential between adjacent teeth 560, represented by blocks 552. Such actuation effects rotation of the actuators 550 to facilitate the herein described movement of the platform 520.

In various embodiments, the platform 520 can be adapted substantially as a ring (e.g., as shown in FIG. 5A). Other shapes are contemplated. The platform 520 can have any desired shape.

Prior to deployment, the actuator device 400 can be a substantially planar structure. For example, the actuator device 400 can be substantially formed from a single, monolithic piece of material, such as silicon. The actuator device 400 can be formed from a single die. The die can be approximately 4 to 5 millimeters across and approximately 150 microns thick, for example.

The actuator device 400 can be formed by a MEMS technique, such as milling or etching. A plurality of actuator devices 400 can be formed upon a single wafer. The overall shape or footprint of the actuator device 400 can be adapted to enhance the formation of a plurality of the actuator devices 400 on a single wafer.

Prior to operation, the fixed frame 517 of each actuator 550 can be deployed to offset the adjacent pairs of teeth 560 represented by blocks 552 with respect to one another, in accordance with an embodiment. Deployment of the actuator device 400 for operation can be effected, for example, as described in commonly owned U.S. Pat. App. Pub. No. 2012/0120262 A1, filed Nov. 15, 2010, now U.S. Pat. No. 8,430,580, issued Apr. 30, 2013, the entire disclosure of which is incorporated herein by reference.

Deployment can result in a substantially non-planar overall configuration of the actuator device 400. When deployed, each actuator 550 can have a portion thereof (e.g., the fixed frame 517) extending from the plane of the outer frame 506. The fixed frame 517 can extend from the plane of the outer frame 506 at an angle with respect thereto. Thus, when deployed, the fixed frame 517 can be substantially out-of-plane with respect to the outer frame 506.

Once deployed, the fixed frames 517 can be fixed or locked into position such that they do not move further with respect to the outer frame 506, and are angularly offset or rotated with respect to the outer frame 506 and with respect to the movable frame 505 (when the actuator 550 is not actuated). The fixed frames 517 can be mechanically fixed in position, adhesively bonded in position, or any desired combination of mechanically fixed and adhesively bonded.

Actuation of the actuator 550 can cause the movable frame 505 to rotate toward the deployed fixed frame 517 to effect desired movement of the platform 520. Motion control torsional flexures 515 and outer hinge flexures 516 cooperate to facilitate motion controlled rotation of the movable frame 505, as discussed herein. The movable frame 505 rotates about the pivot axis 525.

Figure 5B:
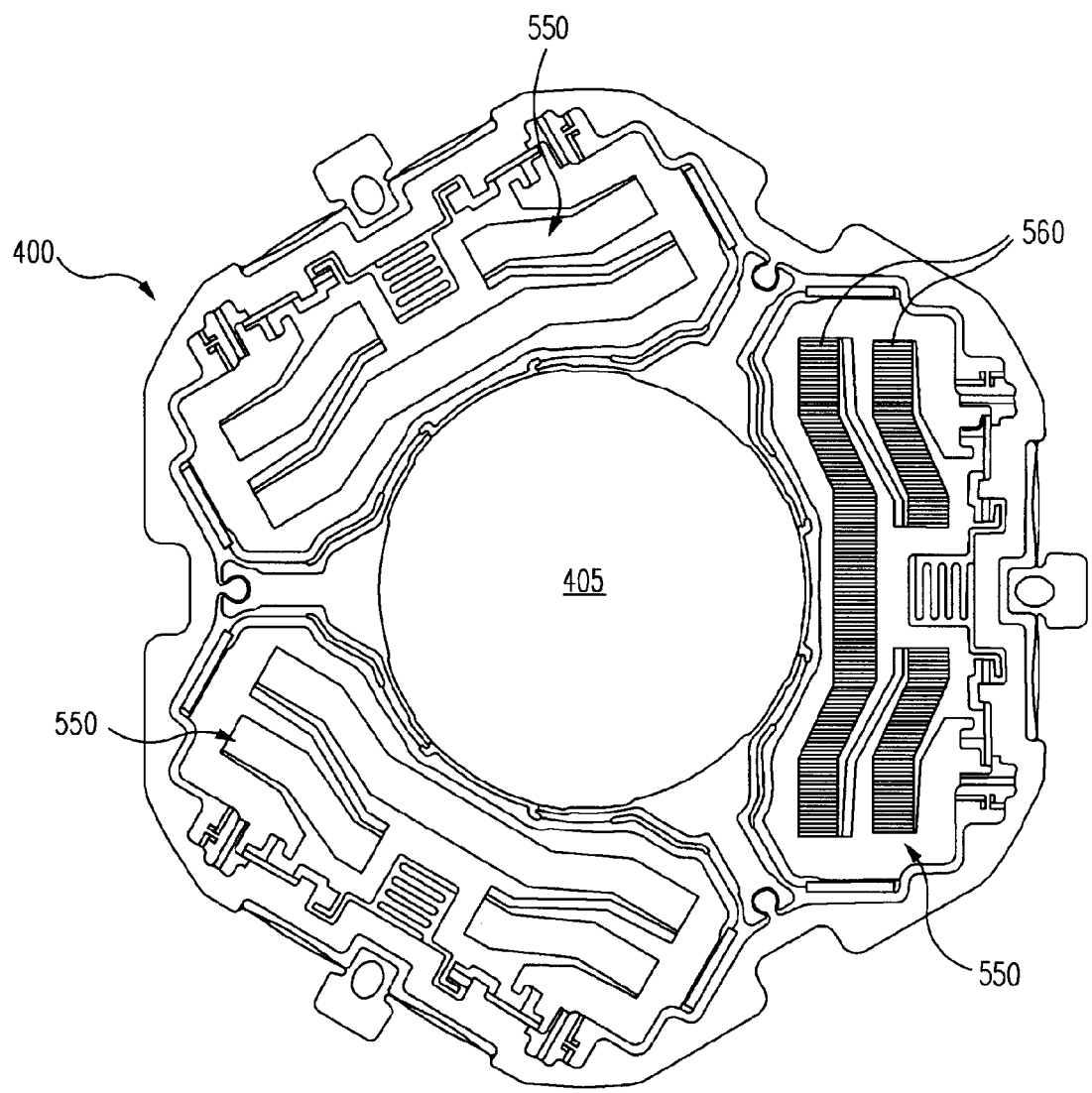
FIG. 5B is another a top plan view of the actuator device.

FIG. 5B illustrates a top view of the actuator device 400 having teeth 560 shown in the actuator 550 in place of the blocks 552 representative thereof, in accordance with an embodiment. The teeth 560 shown can be considered to be reduced in number and exaggerated in size for clarity in FIG. 5B.

Figure 6A:
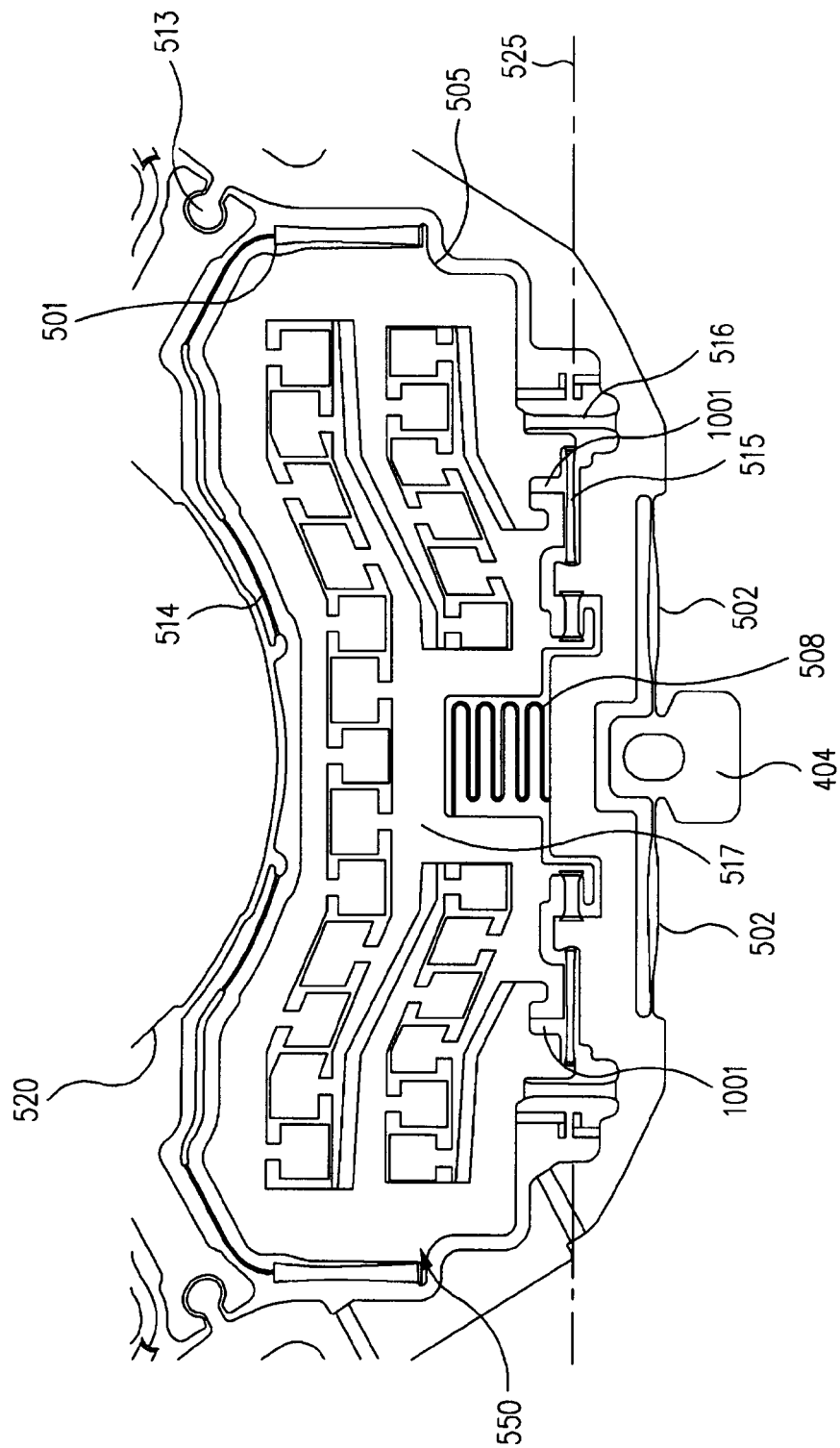
FIG. 6A is an enlarged partial top plan view of the example actuator device, showing an actuator portion thereof.

FIG. 6A illustrates a top view of one of the actuators 550 having the inner hinge flexures 501, the ball-in-socket snubbers 513, the movable frame 505, the outer hinge flexures 516, the motion control torsional flexures 515, the cantilever flexures 514, the fixed frame 517, the pivot axis 525, the serpentine contact flexure 508, the pseudokinematic mount and electrical contact 404, and the platform 520, in accordance with an embodiment. FIG. 6A further illustrates a lateral snubber assembly 1001, which is further described herein.

The inner hinge flexure 501 cooperates with the cantilever flexure 514 to transfer desired motion from the movable frame 505 to the platform 520. Thus, actuation of the actuator 550 results in rotation of the movable frame 505, which in turn results in translation of the platform 520, as discussed herein.

The movable frame 505 can pivot on the outer hinge flexures 516 in a fashion similar to a door pivoting on its hinges. Upon the application of a shear force to the actuator device 400, one of the two outer hinge flexures 516 of the actuator 550 can be in tension while the outer hinge flexure 516 can be in compression. The two motion control torsional flexures 515 tend to mitigate undesirable buckling of the outer hinge flexure 516 in such instances.

Each actuator can be substantially disposed within a motion control mechanism that provides comparatively high lateral stiffness and comparatively soft rotational stiffness. In one embodiment, the motion control mechanism can have one or more (e.g., two) outer hinges flexures 516 and can have one or more (e.g., two) motion control torsional flexures 515. Thus, movement of the movable frame 505 can be substantially constrained to desirable rotation thereof.

In one embodiment, the motion control mechanism for one actuator 550 can comprise the outer frame 506, movable frame 505, the motion control torsional flexures 515, the outer hinge flexures 516, the inner hinge flexures 501, the cantilever flexure 514, and the platform 520. In one embodiment, the motion control mechanism can comprise all structures that tend to limit movement of the platform 520 to desired translational movement.

Each actuator 550 can be substantially contained within the motion control mechanism to substantially limit competition for real estate on the actuator device 400, in accordance with an embodiment. Since each actuator 550 and its associated motion control mechanism occupy substantially the same surface area of the actuator device 400, they do not compete for real estate. Thus, as the actuator 550 increases in size, its associated motion control mechanism can also increase in size. In certain embodiments, it is desirable to increase the size of an actuator 550 to increase the force provided thereby. In certain embodiments, it is desirable to also increase the size of the motion control mechanism to maintain its ability to desirably limit movement of the platform 520. The movable frame 550 can be considered as a portion of the motion control mechanism.

Figure 6B:
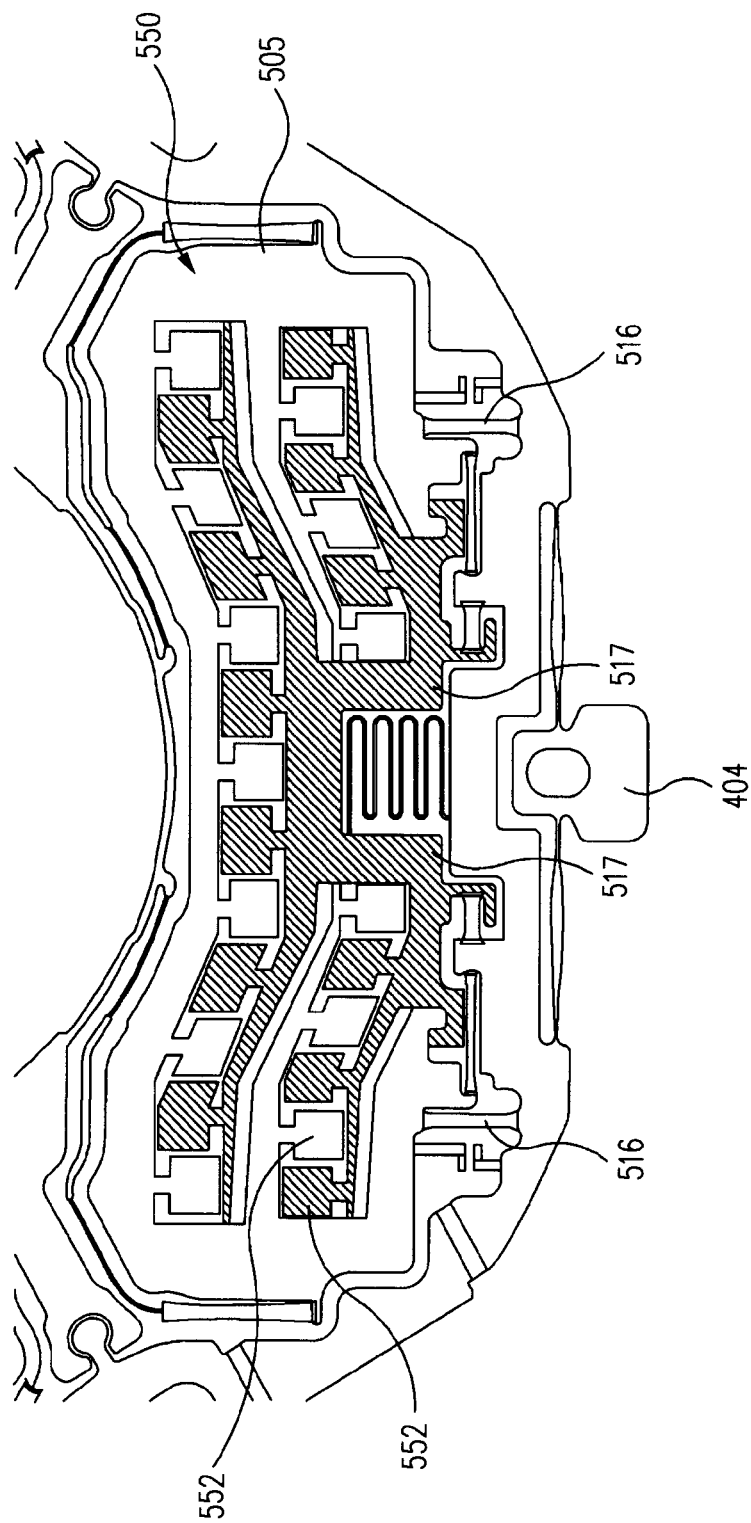
FIG. 6B is an enlarged partial top plan view of the example actuator device, showing another actuator portion thereof.

FIG. 6B illustrates the actuator 550 showing the fixed frame 517 shaded for clarity, in accordance with an embodiment. The shaded fixed frame 517 can be deployed to a position out-of-plane of the actuator device 400 and can be fixed in this deployed position.

Figure 7:
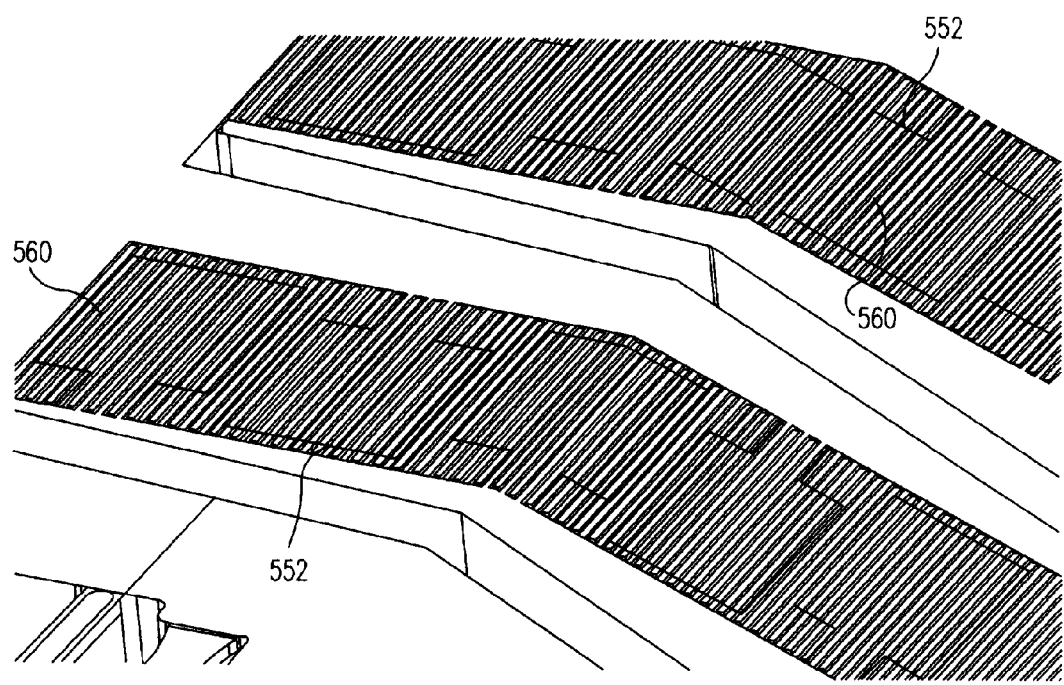
FIG. 7 is an enlarged partial top perspective view of the example actuator of the actuator device.

The movable frame 505 can support moving portions of the actuator 550, such as some of the teeth 560 (see FIG. 7). The fixed frame 517 can support fixed portions of the actuator 550, such as others of the teeth 560 (see FIG. 7). The application of a voltage to the actuator 550 can cause the movable frame 505 to rotate about the outer hinge flexures 516 toward the fixed frame 517. Removal or reduction of the voltage can permit a spring force applied by the inner hinge flexures 514, the outer hinge flexures 516 and the motion control torsional flexure 515 to rotate the movable frame 505 away from the fixed frame 517. Sufficient clearance between the movable frame 505 and the fixed frame 517 can be provided to accommodate such desired movement.

Figure 6C:
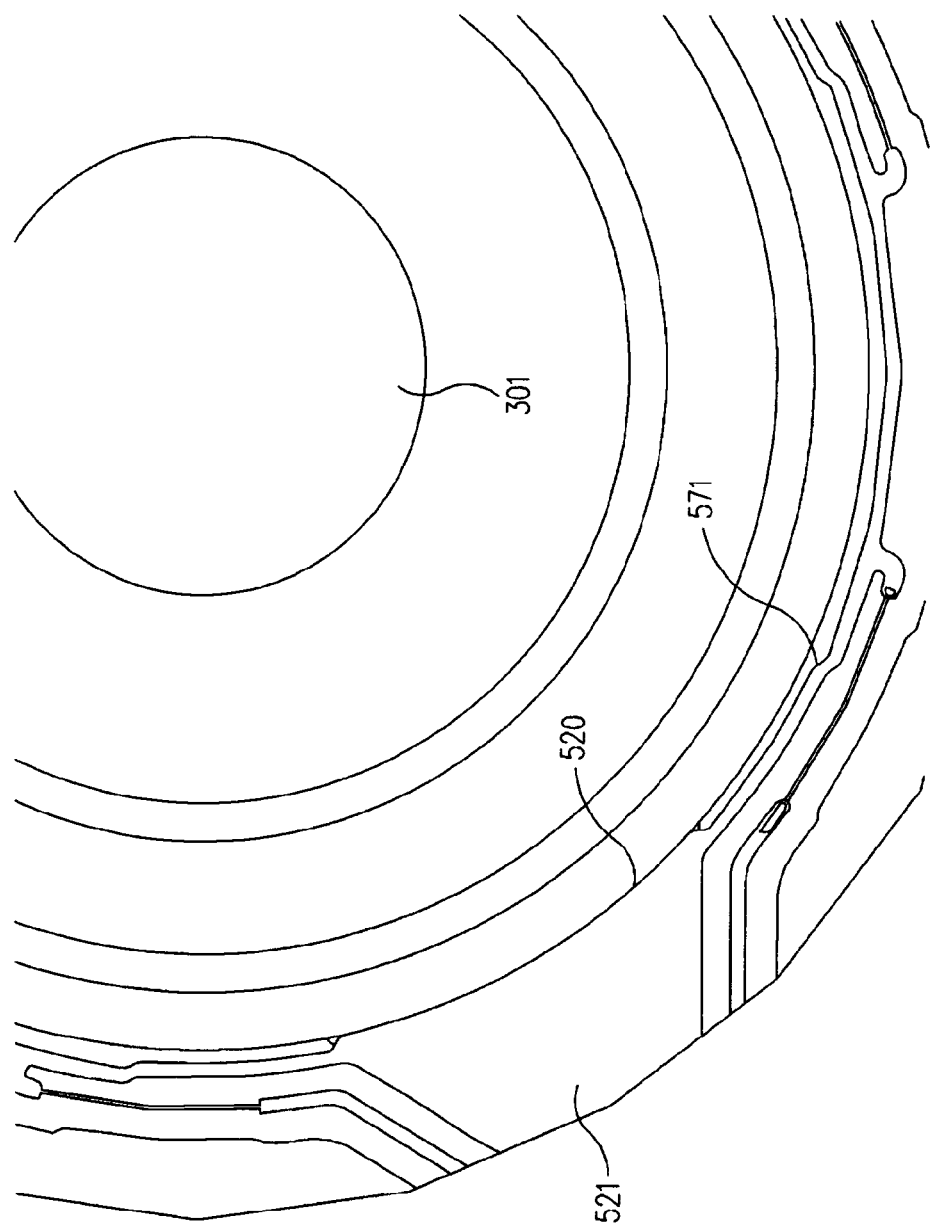
FIG. 6C is a partial top plan view of the example actuator device, showing a portion of a example platform thereof.

FIG. 6C illustrates a portion of the platform 520 having radial variations 571, in accordance with an embodiment. In one embodiment, the radial variations 571 can be formed in the platform 520 to permit the platform 520 to expand. The radial variations 571 can be angular bends in the platform 520. Thus, an optical element, such as the movable lens 301, can be inserted into the opening 405 of the platform 520, which can expand to receive the movable lens 301 and which can grip the movable lens 301. The opening 405 can expand as the radial variations 571 of the platform 520 deform (e.g., tend to straighten), so as to increase the circumference of the opening 405.

Figure 6D:
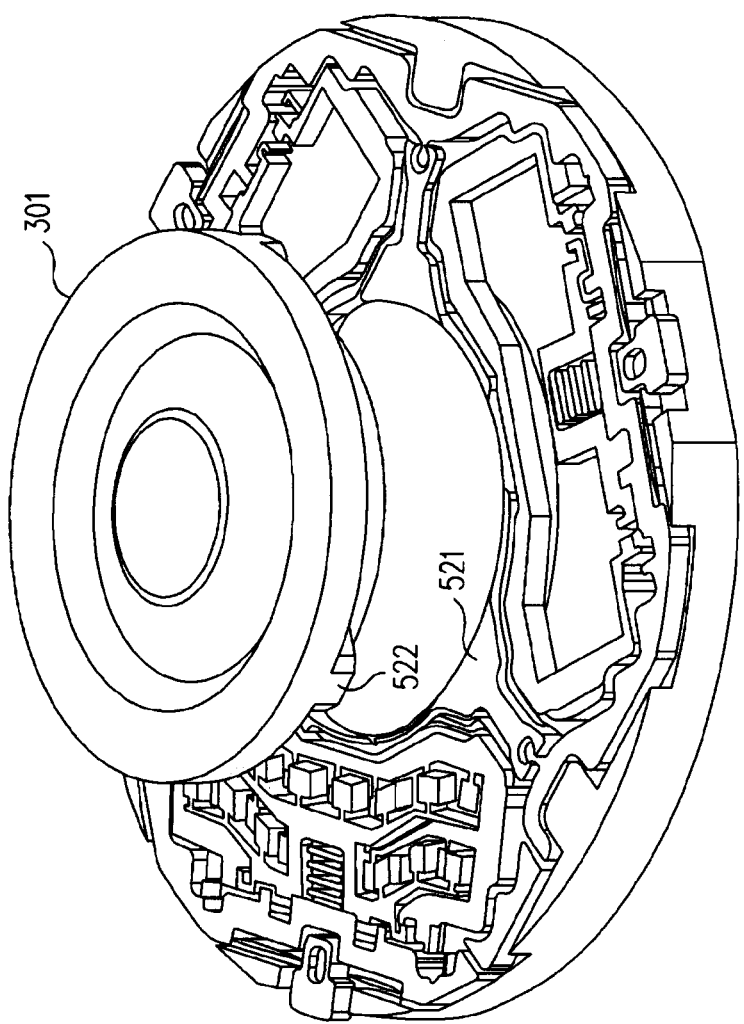
FIG. 6D is an exploded bottom perspective view of a movable lens positioned for mounting to the platform of the example actuator device, in accordance with an embodiment.
Figure 6E:
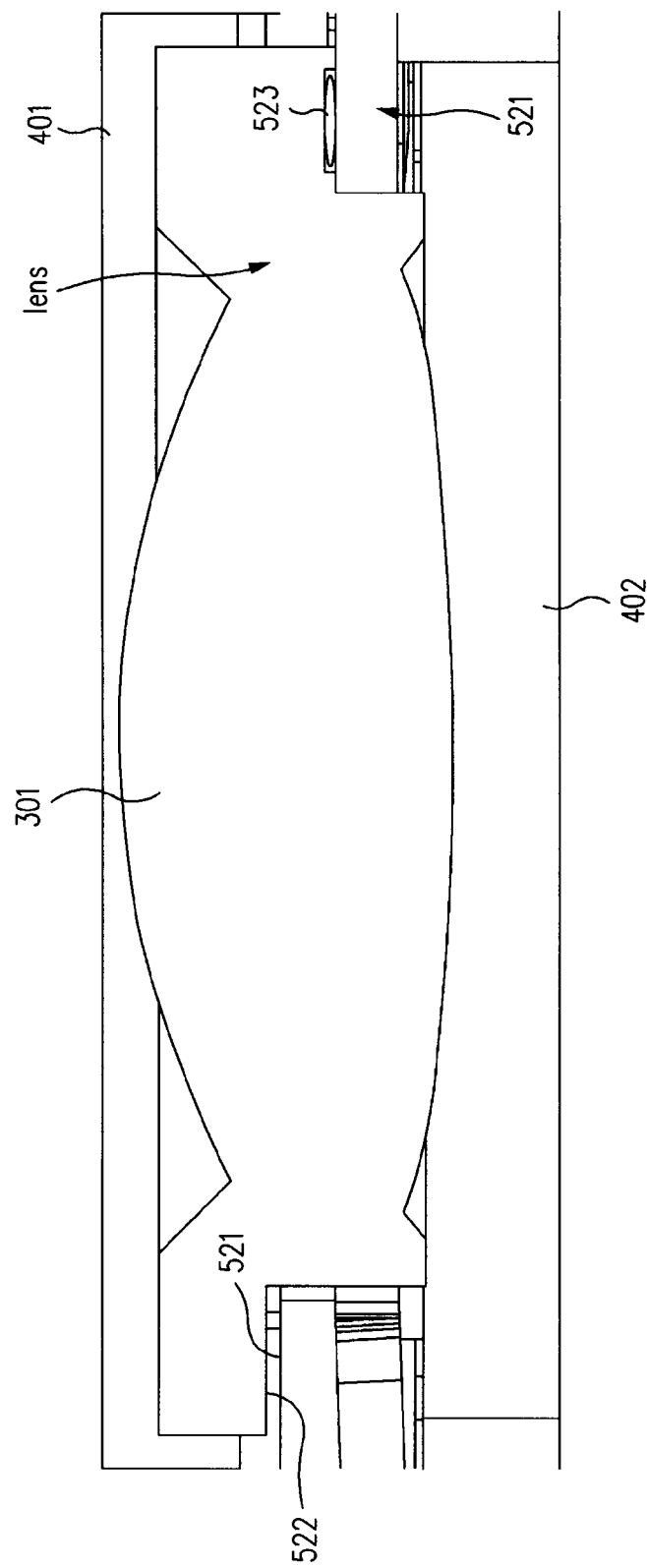
FIG. 6E is a partial side elevation view of the movable lens of FIG. 6D shown mounted to the platform of the example actuator device.

FIG. 6D illustrates a perspective view of a movable lens positioned for mounting to the actuator device 400 and FIG. 6E illustrates a side view of the movable lens 301 attached to the actuator device 400, in accordance with an embodiment. In one embodiment, the movable lens 301 can be adhesively bonded to the platform 550, such as by adhesively bonding standoffs 522 of the movable lens 301 to the lens pads 521. For example, epoxy 523 can be used to adhesively bond the movable lens 301 to the platform 520. The movable lens 301 can be supported by the lens pad 521.

FIG. 7 illustrates a portion of the actuator 550 showing blocks 552 superimposed over the teeth 560 of an actuator 550, in accordance with an embodiment. As discussed herein, the blocks 552 are representative of the teeth 560.

Figure 8:
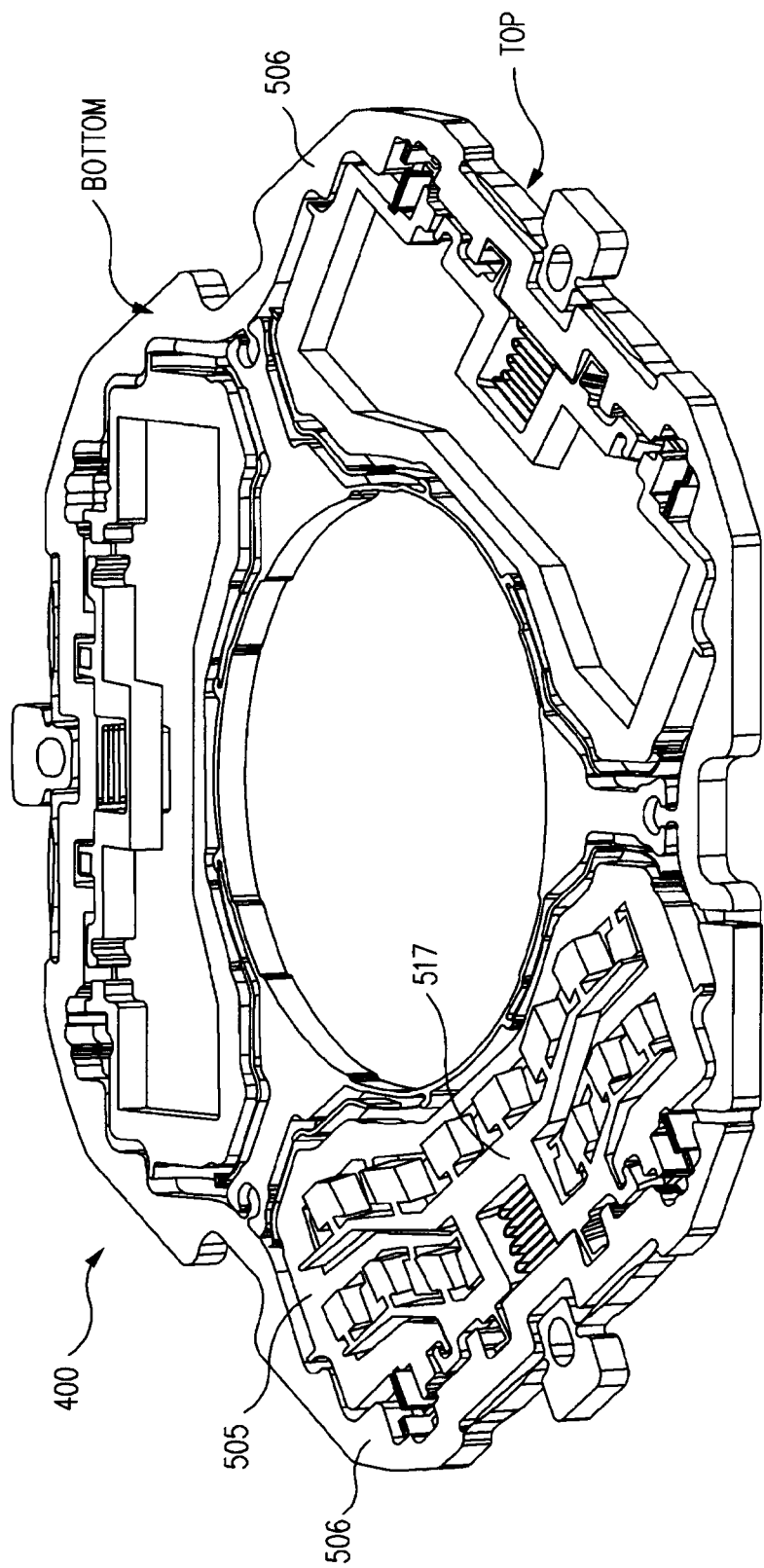
FIG. 8 is a partial bottom and side perspective view of the example actuator device, shown in a deployed configuration.

FIG. 8 illustrates a bottom perspective view of the actuator device 400 in a deployed configuration, in accordance with an embodiment. In the deployed configuration, the unactuated movable frame 505 is disposed substantially in-plane with respect to the outer frame 506 and the deployed fixed frame 517 is disposed substantially out-of-plane with respect to the outer frame 506 and the movable frame 505.

A voltage can be applied to each actuator 550 via the electrical contacts 404. For example, two of the three contacts 404 can be used to apply a voltage from the lens barrel 200 to the actuator device 400. The third contact 404 can be unused or can be used to redundantly apply one polarity of the voltage from the lens barrel 200 to the actuator device 400.

Substantially the same voltage can be applied to the three actuators 550 to result in substantially the same movement of the moving frames 505 thereof. Application of substantially the same voltage to the three actuators 550 can result in translation of the platform 520 with respect to the outer frame 506 such that the platform 520 remains substantially parallel to the outer frame 506. Thus, an optical element such as the movable lens 301 can be maintained in a desired alignment as the optical element is moved, such as along an optical axis 410 (FIG. 3B) thereof.

Substantially different voltages can be applied to the three actuators 550 to result in substantially different movements of the moving frames 505 thereof. Substantially different voltages can be applied to the three actuators 550 using the three contacts 404 and a common return. Thus, each contact 404 can apply a separately controlled voltage to a dedicated one of the three actuators 550.

The application of substantially different voltages to the three actuators 550 can result in translation of the platform 520 with respect to the outer frame 506 such that the platform tilts substantially with respect to the outer frame 506. Thus, when substantially different voltages are applied, the platform 520 does not necessarily remain substantially parallel to the outer frame. The application of different voltages to the three actuators 550 can be used to align the platform 520 to the outer frame 506, for example. The application of different voltages to the three actuators 550 can be used to facilitate optical image stabilization or lens alignment, for example.

Figure 9A:
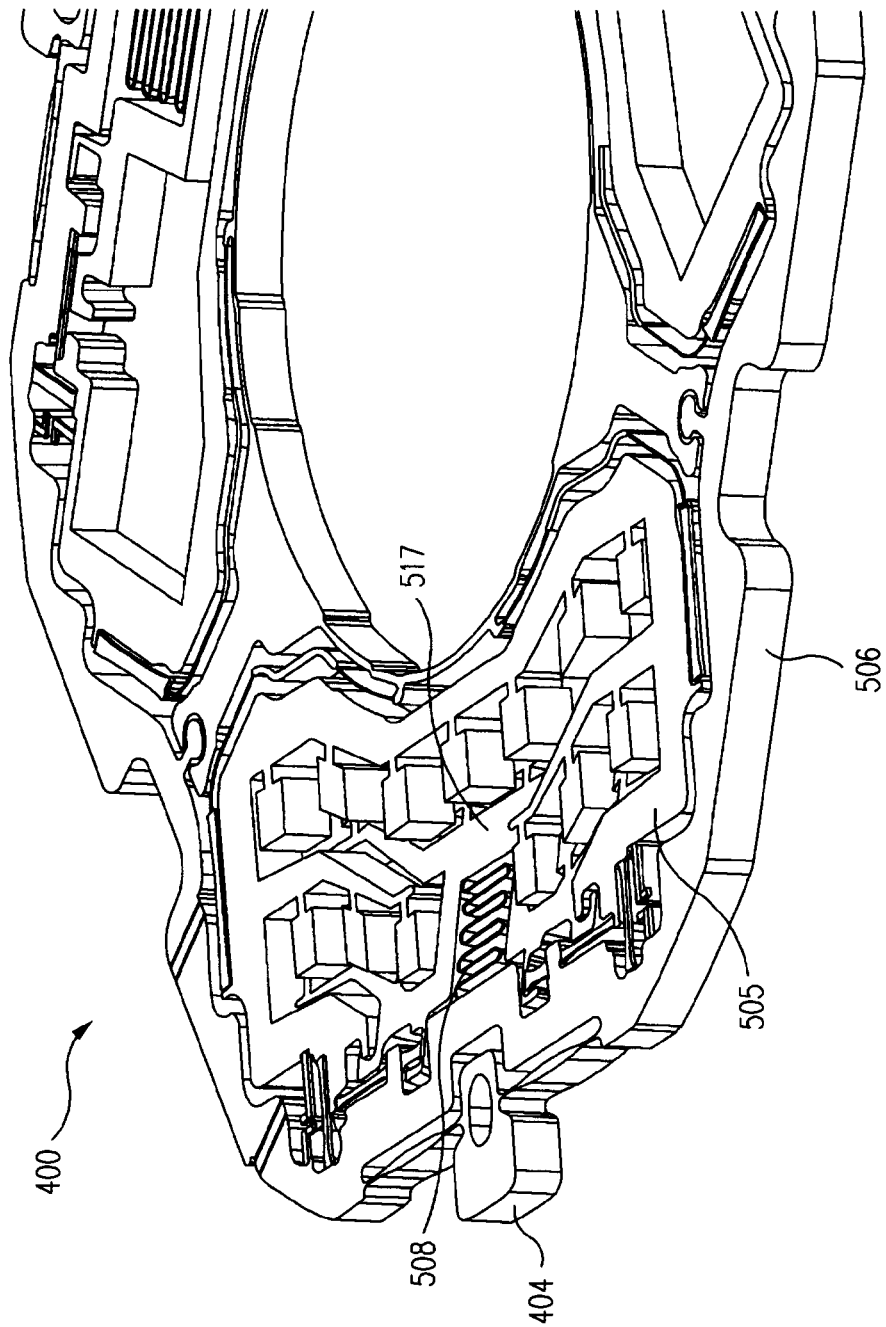
FIG. 9A is a partial top and side perspective view of the actuator device in a deployed configuration, without any actuation voltage being applied thereto.

FIG. 9A illustrates a portion of the actuator device 400 in a deployed configuration, without any voltage being applied thereto, in accordance with an embodiment. Without any voltage applied to the actuator device 400, the movable frame 505 is disposed substantially in-plane with respect to the outer frame 506 and the deployed fixed frame 517 is disposed substantially out-of-plane with respect to the outer frame 506 and the movable frame 505.

FIG. 9B illustrates a portion of the actuator device 400 in a deployed configuration, with a small voltage being applied thereto, in accordance with an embodiment. With the small voltage applied, the movable frame 505 has rotated toward the deployed fixed frame 517 and is in a partially actuated position.

Figure 9C:
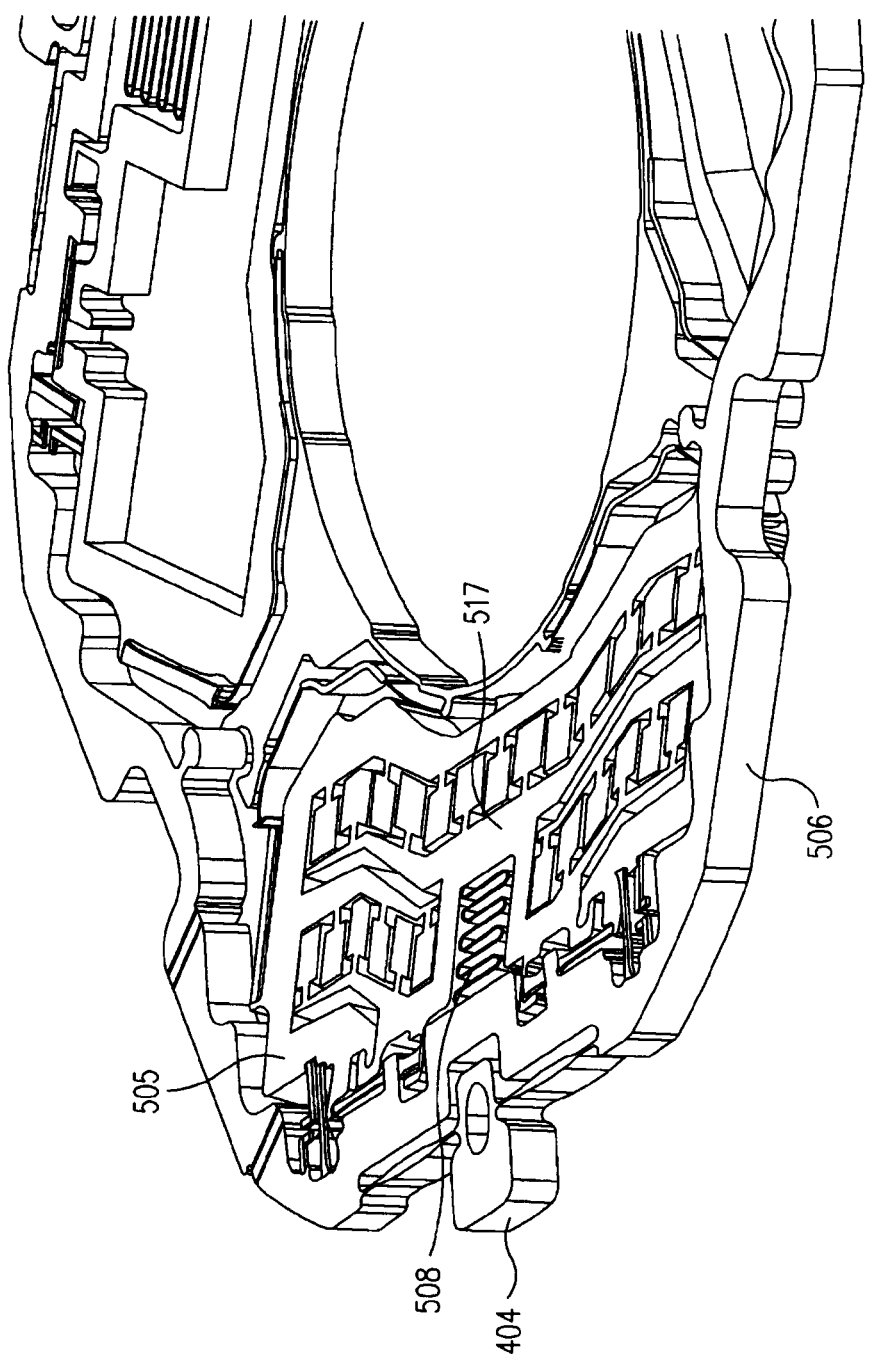
FIG. 9C is a partial top and side perspective view of the actuator device in a deployed configuration, with a maximum actuation voltage being applied thereto.

FIG. 9C illustrates a portion of the actuator device 400 in a deployed configuration, with a maximum voltage applied thereto, in accordance with an embodiment. As can be seen, the movable frame 505 has rotated further toward the deployed fixed frame 517 and is in a fully actuated position.

Figure 10:
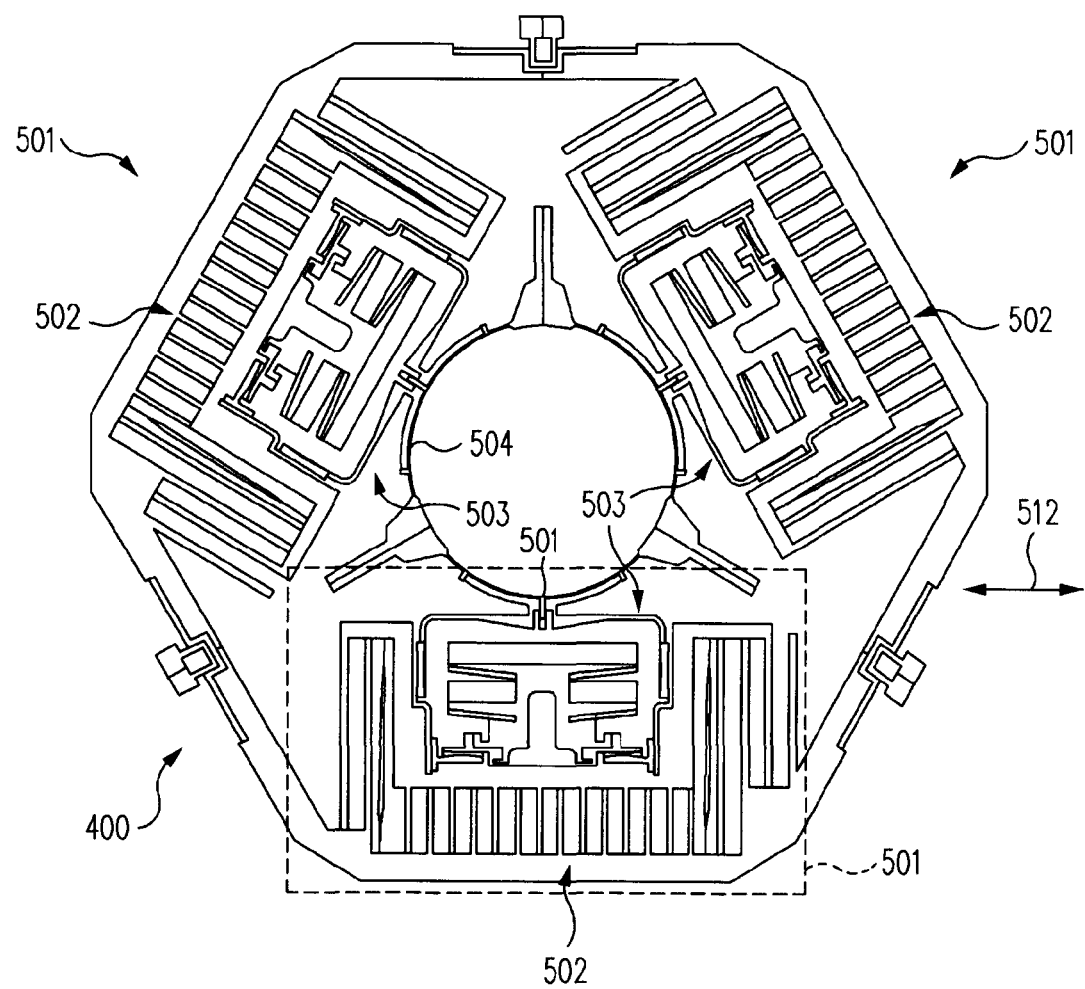
FIG. 10 is a top plan view of an example embodiment of another actuator device in accordance with the present invention.

FIG. 10 is a top plan view of another example embodiment of an actuator device 400, a six degree of freedom (DOF) actuator device 400, in accordance with the invention. The six DOF actuator device 400 can provide controlled movement of an article, such as an optical element, in six degrees of freedom, for use in a variety of applications. The six DOF actuator device 400 can provide three degrees of linear or translational motion, and three degrees of angular or rotational motion.

The six DOF actuator device 400 can comprise three substantially identical sectors 501. Each sector 501 can comprise both an X-Y, tangential or in-plane actuator 502 and a Z-motion or out-of-plane actuator 503. The in-plane actuators 502 can be linear electrostatic comb drives, for example. The out-of-plane actuators 503 can be rotational electrostatic comb drives, for example. The out-of-plane actuators 503 can be linear, e.g., vertical or 2-axis, electrostatic comb drives, for example. Each of the in-plane actuators 502 and each of the out-of-plane actuators 503 can be independently controllable and movable with respect to one another to effect the six degrees of freedom of movement.

The in-plane actuators 502 and the out-of-plane actuators 503 can control the motion of a platform 504. The platform 504 can define a lens ring and can be used to mount one or more lenses. For example, the platform 504 can mount the lens 301, which can be a focusing lens and/or a zoom lens. The platform 504 can be moved in all six degrees of freedom with the actuator device 400, i.e., ±X, ±Y, ±Z, ±$\theta_x$, ±$\theta_y$, and ±$\theta_z$.

Since the platform 504 can be moved in all six degrees of freedom, it can facilitate focus, zoom, optical image stabilization, optical element alignment, and/or optical correction for example. Focus and/or zoom can be facilitated by translating one or more lenses along the Z-axis. Optical image stabilization and/or optical element alignment can be facilitated by translating one or more lenses or another optical element within the X-Y plane and/or by rotating the lens or other optical element(s) about the X-axis and/or the Y-axis.

Although FIG. 10 shows the six DOF actuator device 400 as having three in-plane actuators 502, the six DOF actuator device 400 can have any number of in-plane actuators 502. For example, the six DOF actuator device 400 can have one, two, three, four, five, six, or more in-plane actuators 502.

Each in-plane actuator 502 can provide tangential movement of the platform 504. That is, each in-plane actuator 502 can move a point 511 on a periphery of the platform 504 in a direction that is substantially tangential with respect to the periphery of the platform 504, as indicated by arrow 512.

All of the in-plane actuators 502 can cooperate to provide translational movement of the platform 504 within the X-Y plane (i.e., within the plane of the six DOF actuator device 400). Such X-Y plane movement of the platform 504 can be used to translate the lens 301 for optical image stabilization or alignment, for example.

All of the in-plane actuators 502 can also cooperate with one another to provide Z-axis rotational movement of the platform 504. Such Z-axis rotational movement can be used, for example, to rotate a direction-sensitive optical element, such as a polarizer or a diffraction grating.

Although FIG. 10 shows the six DOF actuator device 400 as having three out-of-plane actuators 503, the six DOF actuator device 400 can have any number of out-of-plane actuators 503. For example, the six DOF actuator device 400 can have one, two, three, four, five, six, or more out-of-plane actuators 503.

The out-of-plane actuators 503 can cooperate to provide translational movement of the platform 504 along the z-axis (which is perpendicular with respect to the plane of the six DOF actuator device 400). Such z-axis movement of the platform 504 can be used to translate the lens 301 for focus and/or zoom, for example. The out-of-plane actuators 503 can cooperate with each other to provide rotational movement of the platform 504 about the X-axis and/or the Y-axis. Such rotational movement can be used to rotate the lens 301 for optical image stabilization or alignment, for example.

Figure 11:
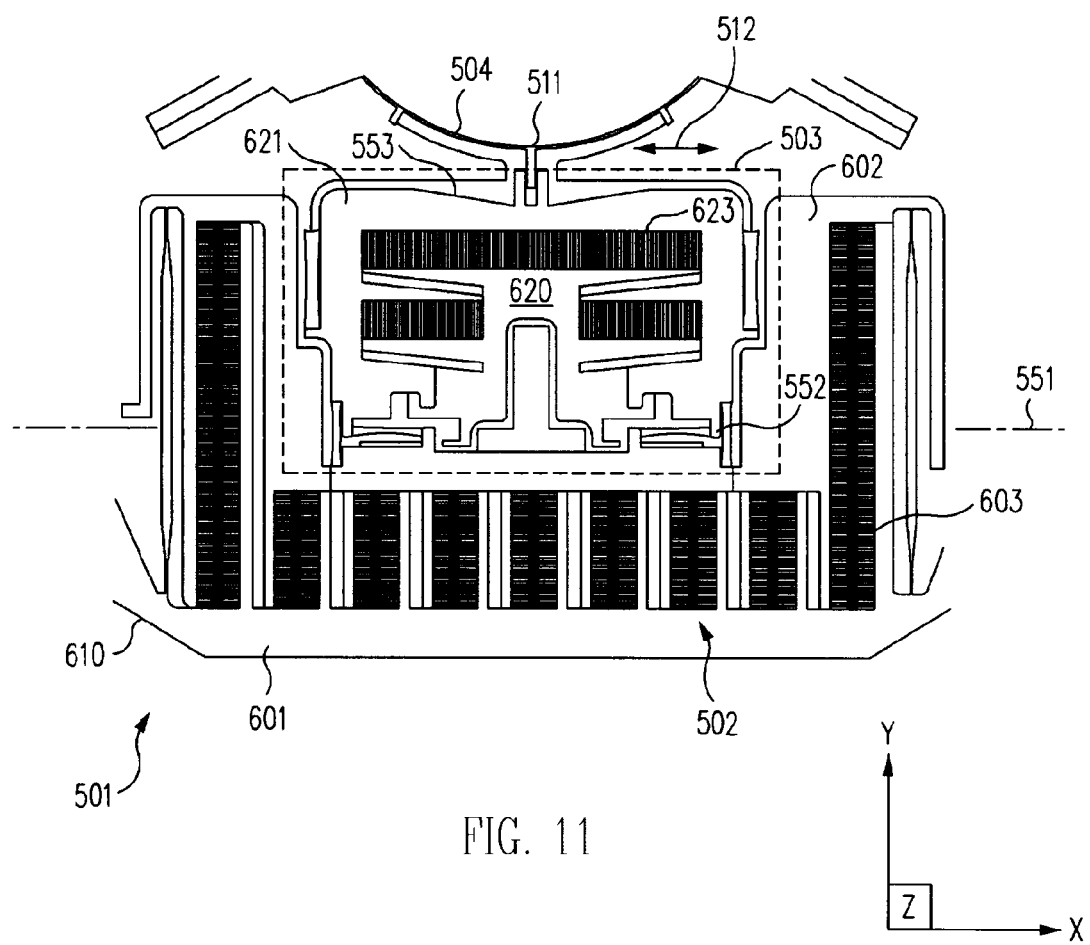
FIG. 11 is an enlarged partial top plan view of the example actuator device of FIG. 10, showing an actuator thereof.

FIG. 11 is an enlarged partial top plan view showing one sector 501 of the six DOF actuator device 400 of FIG. 10, in accordance with an embodiment of the invention. As shown in FIG. 10, the six DOF actuator device 400 comprises three sectors 501. However, the six DOF actuator device 400 can comprise any desired number of such sectors 501. For example, the six DOF actuator device 400 can comprise one, two, three, four, five, six, or more sectors 501.

As illustrated in FIG. 11, the in-plane actuators 502 can each comprise a fixed X-Y frame 601 and a movable X-Y frame 602. Interdigitated comb fingers or teeth 603 can extend from the fixed X-Y frame 601 and the movable X-Y frame 602 and can cooperate to define an electrostatic actuator that effects substantially linear movement of the movable X-Y frame 602 with respect to the fixed X-Y frame 601. The movable X-Y frame 602 moves within the X-Y plane. The movable X-Y frame 602 moves back and forth in the directions indicated by double-headed arrow 512.

The fixed x-y frame 601 of each sector 501 can cooperate to define an outer frame 610 of the six DOF actuator device 400. The outer frame 610 can substantially rigidly interconnect each of the sectors 501 to one another.

In the particular example actuator device 400 illustrated, both the in-plane actuators 502 and the out-of-plane actuators 504 must first be reconfigured from an as-manufactured state to a "deployed" state prior to their use as actuators. Methods and apparatus for effecting this deployment can be as described in, for example, commonly owned U.S. Pat. App.

Pub. No. 2012/0081598 A1, filed Sep. 28, 2011, now U.S. Pat. No. 8,941,192, issued Jan. 27, 2015, and incorporated herein by reference in its entirety.

The out-of-plane actuators 503 can each thus comprise an out-of plane, deployed Z-frame 620 and a movable Z-frame 621. Interdigitated comb fingers or teeth 623 can extend from the deployed Z-frame 620 and the movable Z-frame 621, and can cooperate to define an electrostatic actuator that effects movement of the movable Z-frame 621 with respect to the deployed Z-frame 620. The movable Z-frame 621 rotates so as to provide movement of an associated portion of the platform 504 substantially along the Z axis.

The deployed Z-frame 620 can be deployed to a position such that the deployed Z-frame 620 is angularly disposed with respect to the plane of the six DOF actuator device 400. That is, the deployed Z-frame 620 can be rotated about a hinge line 551 (see FIG. 11) that passes through a proximal portion 552 of the deployed z-frame 620 so as to cause a distal portion 553 of the deployed Z-frame 620 to move out of the plane of the six DOF actuator device 400 and into the deployed position of the deployed Z-frame 620. The deployed position of the deployed Z-frame 620 can be disposed either above or below (i.e., on either side of) the plane of the six DOF actuator device 400.

Figure 12:
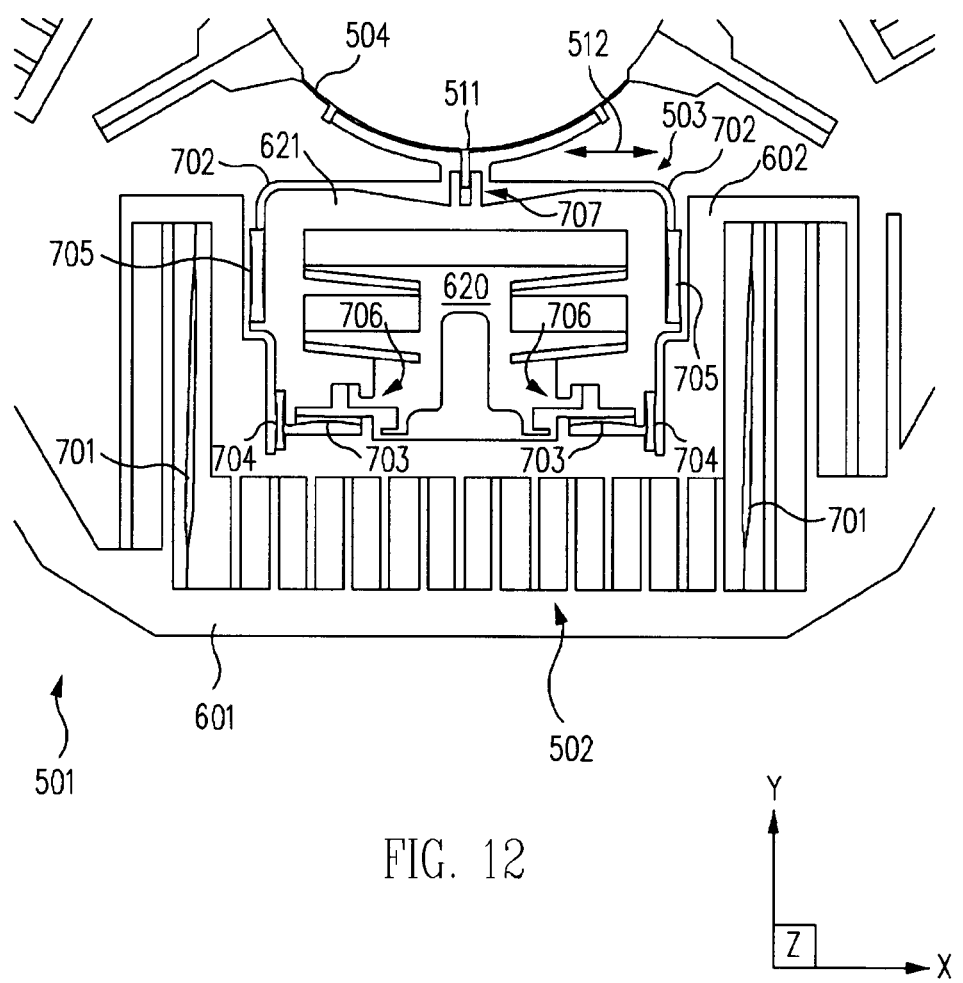
FIG. 12 is an enlarged partial top plan view of the actuator shown in FIG. 11, wherein the teeth of comb drives of the actuator have been omitted for clarity of illustration.

FIG. 12 shows the sector 501 of FIG. 11 with the teeth 603 and 623 removed for clarity of illustration, in accordance with an embodiment of the invention. Motion control features can be used to limit the motion of the in-plane actuators 502 and the out-of-plane actuators 503. The motion control features can consequently limit the motion of the platform 504, since the motion of the platform 504 is controlled by the in-plane actuators 502 and the out-of-plane actuators 503.

For example, tangential movement flexures 701, cantilever flexures 702, torsional flexures 703, outer hinge flexures 704, and inner hinge flexures 705 can be used to facilitate motion control.

The tangential movement flexures 701 can facilitate lateral movement of the in-plane actuators 502 so as to provide tangential movement of the platform 504. This can be done while the tangential movement flexures 701 inhibit movement of the in-plane actuators 502 in other degrees of freedom.

The cantilever flexures 702 can transfer z-axis motion of the out-of-plane actuators 503 to the platform 504 while accommodating the varying distance between out-of-plane actuators 503 and the platform 504. This can be done while the cantilever flexures 702 inhibit movement of the out-of-plane actuators 503 in other degrees of freedom.

The torsional flexures 703 can facilitate rotational movement of the movable z frames 621 of the out-of-plane actuators 503 so as to provide movement of the platform 504 along the Z axis. This can be done while the torsional flexures 703 inhibit movement of the movable Z-frames 621 in other degrees of freedom. In particular, the torsional flexures 703 inhibit movement of the movable Z-frames 621 along the X axis.

The outer hinge flexures 704 can facilitate rotational movement of the movable z frame 621 of the out-of-plane actuators 503 so as to provide movement of the platform 504 along the Z-axis. This can be done while the outer hinge flexures 704 inhibit movement of the movable Z-frame 621 in other degrees of freedom. In particular, the outer hinge flexures 704 inhibit movement in the Y direction.

The inner hinge flexures 705 can facilitate rotational movement of the out-of-plane actuators 503 as the cantilever flexures 702 transfer Z-axis motion of the out-of-plane actuators 503 to the platform 504. This can be done while the inner hinge flexures 705 inhibit movement of the platform 504 in other degrees of freedom.

Each of the out-of-plane actuators 503 can have two proximal lateral snubber assemblies 706 and one distal lateral snubber assembly 707 to provide further motion control, for example. The proximal lateral snubber assemblies 706 can inhibit lateral movement of the movable Z-frame 621 with respect to the deployed Z-frame 620. The distal lateral snubber assembly 707 can inhibit lateral movement of the platform 504 with respect to the movable Z-frame 621.

Figure 13:
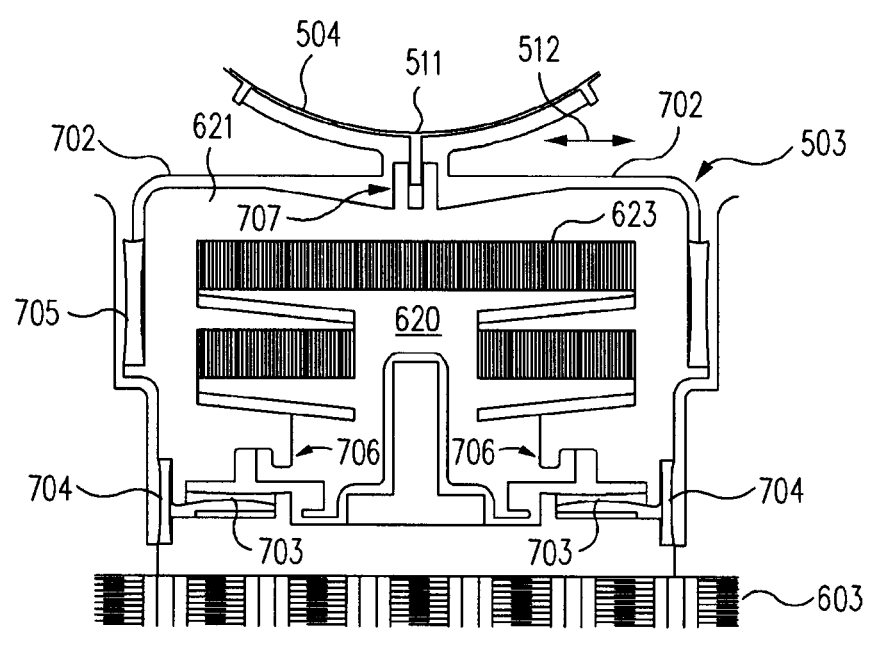
FIG. 13 is an enlarged partial top plan view of the actuator portion of FIG. 12, showing an out-of-plane portion of the actuator.

FIG. 13 is an enlarged partial plan view showing the out-of-plane actuator 503 of FIG. 12, in accordance with an embodiment of the invention. The interdigitated teeth 603 of the in-plane actuators 502 and the interdigitated teeth 623 of the out-of-plane actuators 503 are shown in the figure.

Figure 14:
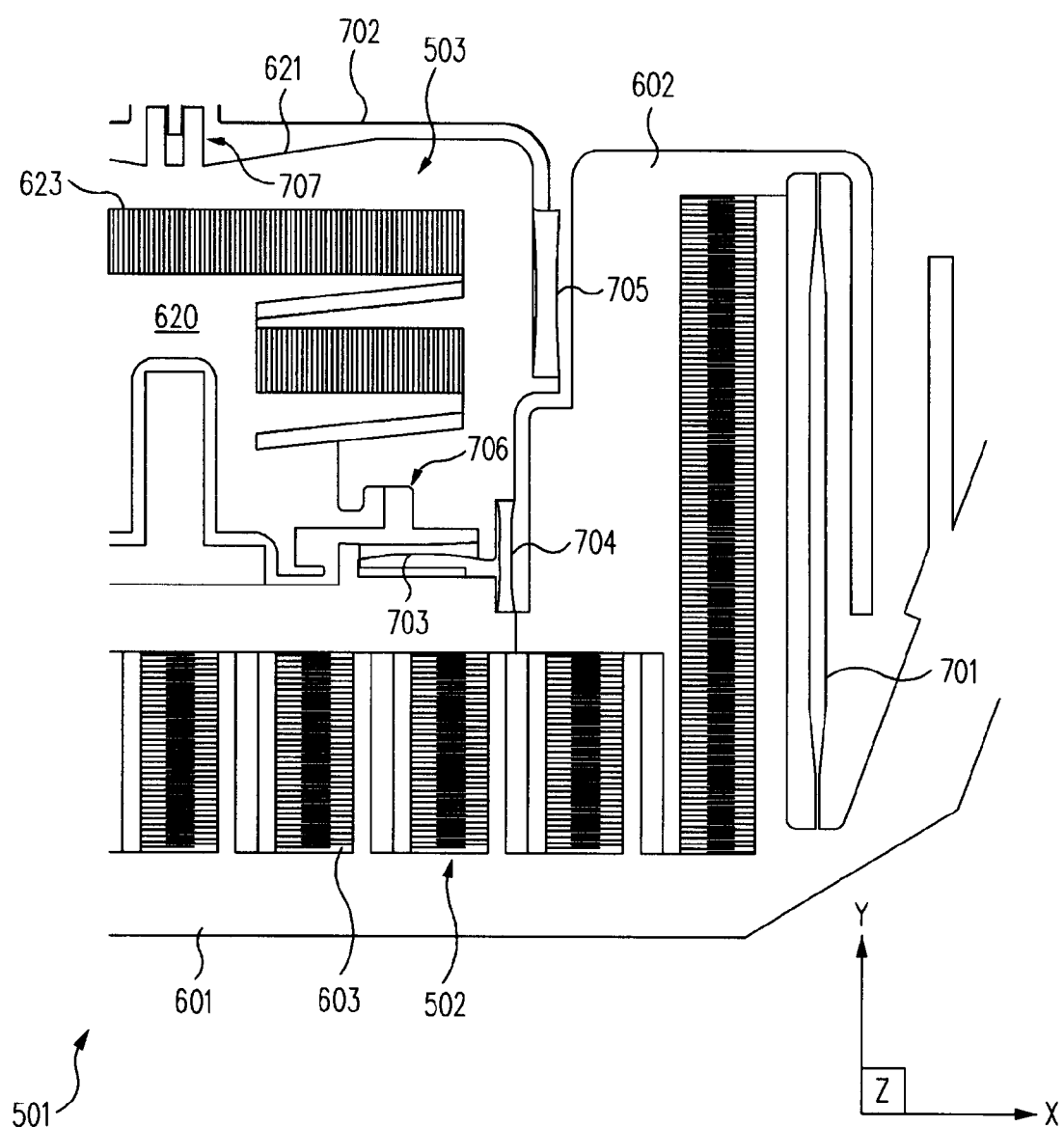
FIG. 14 is an enlarged partial top plan view of the actuator of FIG. 11, showing an in-plane portion and an out-of-plane portion of the actuator.

FIG. 14 is an enlarged partial plan view showing a portion of the in-plane actuator 502 of FIG. 12, in accordance with an embodiment of the invention. Some of the motion control features described above can be more clearly seen in this view. For example, one of the tangential movement flexures 701, one of the cantilever flexures 702, one of the torsional flexures 703, one of the outer hinge flexures 704, and one of the inner hinge flexures 705 can be more clearly seen.

In operation, the three out-of-plane actuators 503 can move in unison to translate one or more lenses in a Z direction and thereby facilitate focus and/or zoom. The three out-of-plane actuators 503 can also move independently of one another to rotate one or more lenses in a $\theta_x$ and/or $\theta_y$ direction to facilitate, e.g., optical image stabilization and/or alignment of the lens(es). The three in-plane actuators 502 can also move either in unison or independently of one another to translate and/or rotate one or more lenses or another optical element in the plane of the actuator device 400 to facilitate, e.g., optical image stabilization or alignment of the lens(es) or optical element.

Any of the in-plane actuators 502 and the out-of-plane actuators 503 can be biased or moved to a given position that can be deemed a "zero," "centered," or "operating" position. As discussed below in connection with FIGS. 19, 20A and 20 B, the operating position can be located anywhere along the range of travel for the rectilinearly acting in-plane actuators 502 and the rotationally acting out-of-plane actuators 503. The operating position can correspond to a predetermined alignment position of the lens(s) or other optical elements. The in-plane actuator(s) 502 and/or the out-of-plane actuator(s) 503 can remain in this centered position until driven to a different position to effect focus, zoom, and/or optical image stabilization. As discussed in more detail below, the actuators 502 and 503 can also be "driven" back to the operating position in a closed loop, "force rebalance" system to enable them to function as inertial sensors.

The state or position of each of the in-plane actuators 502 and each of the out-of plane actuators 503 can be controlled by providing a control, or bias signal or voltage thereto. Generally, higher voltages will result in greater movement of the in-plane actuators 502 and the out-of-plane actuators 503. As discussed in more detail below, the bias voltage can be harmonically varying, e.g., sinusoidal, so as to cause the platform 504 and any mass mounted thereon, such as the lens 301, to vibrate, either linearly, rotationally, or both, as a desired frequency.

Figure 15:
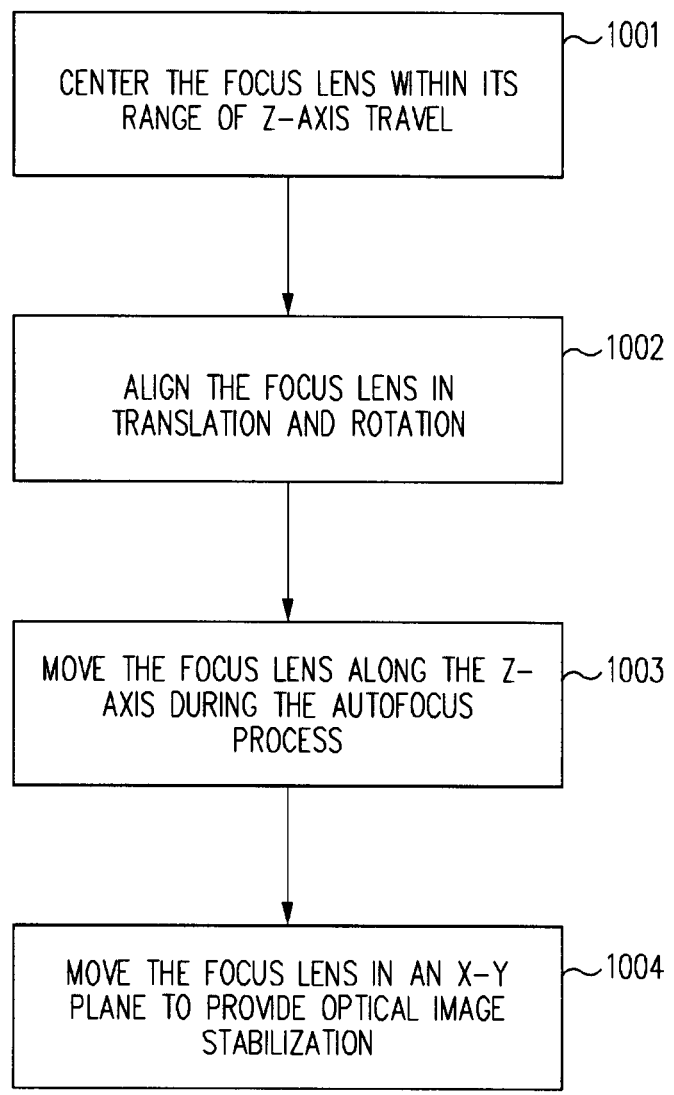
FIG. 15 is a flow chart of an example embodiment of an operation performed with the example actuator of FIGS. 10-14 in accordance with the present invention.

FIG. 15 is a flow chart showing an example of operation of the six DOF actuator device 400, in accordance with an embodiment of the invention. As discussed above, on power up of the electronic device 100 and/or the miniature camera 101, the in-plane actuators 502 and/or the out-of-plane actuators 503 can move the lens 301 to an operating position defined by coordinates X, Y, Z, $\theta_X$, $\theta_Y$, and/or $\theta_Z$.

More particularly, the out-of-plane actuators 503 can move the lens to a position proximate the center of travel of the lens 301, as indicated in block 1001, and the in-plane actuators 502 can cooperate with the out-of-plane actuators 503 to align the lens in all six degrees of freedom, as indicated in block 1002.

During an autofocus process, the lens 301 can be moved by the out-of-plane actuators 503 to a position that provides a desired focus of the miniature camera 101, as indicated in block 1003. This movement can be accomplished while maintaining the alignment of the lens 301.

During an optical image stabilization process, the in-plane actuators 502 and/or the out-of-plane actuators 503 can cooperate to move the lens 301 in a manner that provides optical image stabilization as indicated in block 1004. Aligning the lens 301, focusing with the lens 301, and providing optical image stabilization with the lens 301 can occur serially, in parallel with one another, or partially serially and partially in parallel (i.e., can overlap) with one another.

The use of actuator devices together with inertial sensors to effect optical image stabilization is described in commonly owned U.S. patent application Ser. Nos. 13/247,895 and 13/247,906, both filed Sep. 28, 2011, now U.S. Pat. No. 9,019,390, issued Apr. 28, 2015, and U.S. Pat. No. 8,855,476, issued Oct. 7, 2014, respectively, the entire disclosure of each of which is incorporated herein by reference.

Figure 16:
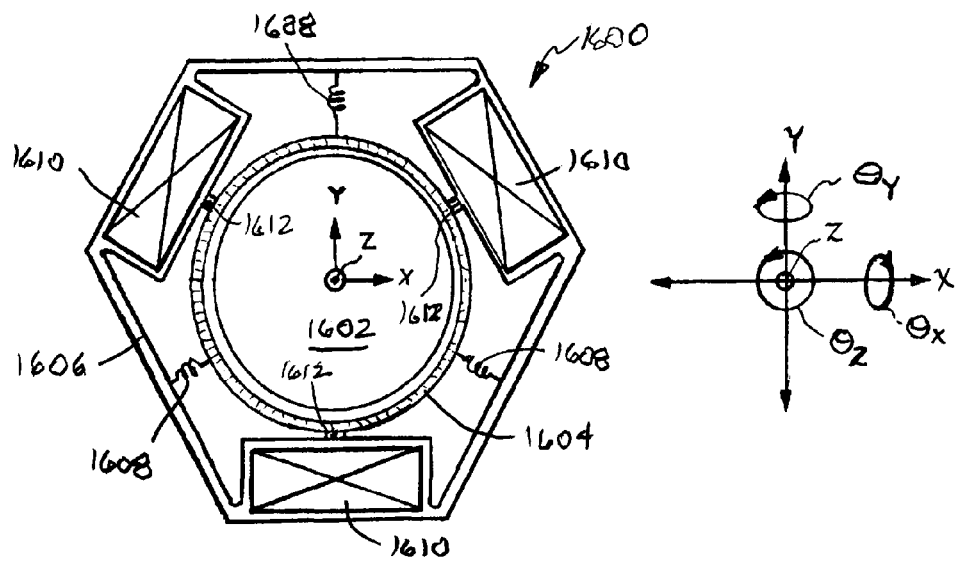
FIG. 16 is a schematic top plan view of an actuator device in accordance with the present invention.

FIG. 16 is a schematic top plan view of a "generic," generally planar actuator device 1600 comprising an optical element 1602, such as a mirror or lens, supported in a moveable platform 1604, as described above. The platform 1604 is coupled to an outer frame 1606 by a first plurality of flexures 1608 for movement relative thereto, and to each of a plurality of actuators 1610 by respective ones of a second plurality of flexures 1612 for movement by the actuators 1610. The particular example embodiment of FIG. 16 includes three actuators 1610, which are arrayed around the platform 1604 in equal angular increments of 120 degrees. However, as discussed above, in other possible embodiments, the number and arrangement of the actuators 1610 can be different than that shown.

In one embodiment, the actuators 1610 can comprise, for example, out-of-plane-only actuators of the type described above in connection with FIGS. 9A-9C, i.e., actuators that are capable of moving the platform 1604 and lens 1602 in three degrees of movement, viz., $\pm Z$, $\pm \theta_X$, and $\pm \theta_Y$, that is, rectilinearly along the Z axis and rotationally about the X and Y axes, as illustrated in the set of orthogonal coordinates shown at the right of FIG. 16.

In another embodiment, the actuators 1610 can comprise in-plane-only actuators of the type described in, e.g., U.S. Pat. Nos. 8,941,192 and 9,019,390 above. In such an embodiment, the actuators 1610 are likewise capable of moving the platform 1604 and lens 1602 in three degrees of movement, viz., $\pm X$, $\pm Y$, and $\pm \theta_Z$, that is, rectilinearly in the X-Y plane and rotationally about the Z axis.

In yet another embodiment, the actuators 1610 can comprise six DOF actuators of the type described above in connection with FIGS. 10-14, i.e., actuators having both out-of-plane and in-plane capabilities, and which are capable of moving the lens 1602 and support 1604 in six degrees of movement, viz., $\pm X$, $\pm Y$, $\pm Z$, $\pm \theta_X$, $\pm \theta_Y$, and $\pm \theta_Z$, that is, both rectilinearly along and rotationally about each of the X, Y, and Z axes.

As those of some skill will understand, in the actuator device 1600 of FIG. 16, the optical element or lens 1602 and the support 1604 will have an effective mass, the flexures 1608 and 1612 will have an effective spring constant, and any gas, e.g., air, surrounding the mass, together with the respective inherent material damping characteristics of the flexures, will combine to form an effective damping mechanism, i.e., a "dashpot," that acts to damp movement of the support-lens mass. The actuator device 1600 thus comprises a classic mass-spring-dashpot system having at least one "natural," or resonant frequency. This, in turn, suggests that the actuator device 1600 can be used not only to move the lens 1602 and platform 1604 to a desired position to effect focusing, zooming and image stabilization features in, e.g., a camera, but also as an inertial sensor that is simultaneously capable of providing information useful for measuring, e.g., tilt and inclination of the camera in a gravity field, rotation rate of the camera, vibration and shock forces acting on the camera, and position, velocity and acceleration of the camera.

Inertial sensors are devices that use inertia to perform measurements, and generally comprise two types, viz., accelerometers and gyroscopes. An accelerometer is a sensor that measures linear acceleration or translational motion. A gyroscope is a device that measures angular rotation, i.e., an angular rate sensor. As discussed in more detail below, embodiments of the actuator devices described herein can, in addition to serving as mechanisms to move an element, e.g., a lens, in a desired fashion, can also function simultaneously as an inertial sensor, i.e., an accelerometer and/or a gyroscope.

Figure 17:
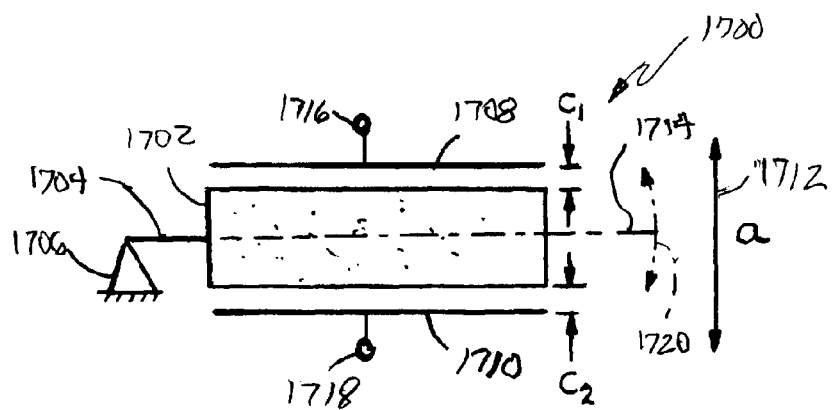
FIG. 17 is a schematic cross-sectional view of an MEMS-type inertial sensor.

FIG. 17 is a schematic cross-sectional schematic view of a known type of MEMS inertial sensor 1700. The inertial sensor 1700 comprises a mass 1702, sometimes referred to as a "pendulous mass" or "proof mass," suspended by a resilient flexure 1704 from a support 1706 and between a pair of opposing electrodes 1708 and 1710, each having an associated terminal 1716 and 1718, for relative movement in response to an inertial force, or acceleration $\alpha$, acting on the support 1706 in the direction of the arrow 1712. That is, the accelerometer 1700 has a single "axis of sensitivity" that is disposed orthogonal to the parallel upper and lower surfaces of the mass 1702. Capacitances $C_1$ and $C_2$ are respectively formed in the gaps between upper and lower surfaces of the mass 1702 and corresponding ones of the electrodes 1708 and 1710. The values of the capacitances C1 and C2 are dependent on the dielectric constant of the medium, e.g., air or a vacuum, disposed in the gaps.

As those of some skill will appreciate, an acceleration $\alpha$ of the support 1706 in, for example, the upward direction in FIG. 17 will cause the support 1706 to accelerate upward, while the mass 1702 will momentarily "lag" the support 1706, i.e., deflect downward toward the lower electrode 1710 and away from the upper electrode 1708. This causes the capacitance $C_2$ to increase in an amount proportional to the displacement of the mass 1702 relative to the support 1706, and the capacitance $C_1$ to decrease in an amount proportional to such displacement. Since the amount of the displacement of the mass 1702 is proportional to the magnitude of the acceleration $\alpha$, the change in the capacitance of $C_1$ and/or $C_2$ can be measured at the terminals 1716 and/or 1718 of the corresponding electrodes 1708 and 1710 and used as a measure of the magnitude of the acceleration $\alpha$ acting on the spring-mass system 1700.

In an alternative, "differential capacitance" embodiment, the difference of the capacitances $\Delta C = C_1 - C_2$ can be computed, and the change in $\Delta C$ measured at the terminals 1716 and 1718 during an acceleration $\alpha$ can be used as a measure of the magnitude of acceleration. In yet another embodiment, and since the capacitances $C_1$ and $C_2$ are proportional to the respective electrostatic charges $c_1$ and $c_2$ extant between the upper and lower surfaces of the mass 1702 and corresponding ones of the electrodes 1708 and 1710, it is also possible to use the corresponding changes in these charges, i.e., Δc, during acceleration as a measure of the magnitude of the acceleration α. In either case, the resulting accelerometer 1700 is sometimes referred to as an "open loop, differential capacitance" accelerometer.

Such accelerometers 1700 are referred to as "open loop" because, when the acceleration α is removed from the support 1706, the spring force of the flexure 1704 will act to return the mass 1702 to its original or "null" position relative to the support 1706, as indicated by the phantom line 1714 in FIG. 17, and consequently, the capacitances of C1 and C2 and associated electrostatic charges $c_1$ and $c_2$ will return to their original values. However, in another, more accurate embodiment, sometimes referred to as a "closed loop, force rebalance" accelerometer, a bias voltage can be applied to the mass 1702 to create a bias field between the mass 1702 and the electrodes 1708 and 1710. In such a sensor, measured changes in the differential capacitance ΔC effected by an acceleration α acting on the support 1706 are fed back in the form of electrostatic field forces applied to the respective electrodes 1708 and 1710 to restore and maintain the mass 1702 at the original or null position indicated by the phantom line 1714 between the two electrodes 1708 and 1710. The electrostatic force required to restore and maintain the mass 1702 at the original or null position 1714 can be used as a measure of the acceleration acting on the system 1700.

While the open loop and closed loop differential capacitance accelerometers described above can provide satisfactory measurements of linear acceleration, and through mathematical techniques, shock, linear velocity, and position, they are not, without more, capable of measuring rotational velocity, or angular rate.

Figure 18:
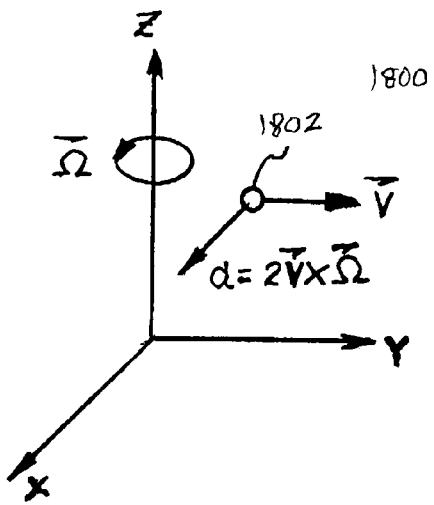
FIG. 18 is a diagram illustrating a Coriolis acceleration of a particle in a rotating inertial frame.

However, it is known that inertial sensors can be adapted to measure rotational velocity indirectly by measuring the Coriolis force acting on a moving mass disposed in a rotating coordinate system. FIG. 18 is a schematic depiction of an inertial coordinate system 1800 in which a mass 1802 is moving with a velocity $\vec{V}$ in a direction parallel with the Y axis, and in which the coordinate system 1800 and mass 1802 are being rotated about the Z axis with a rotational velocity $\vec{\Omega}$. As a result of the Coriolis force, the mass 1802 will experience an acceleration $\vec{\alpha}$ in a direction normal to the direction of movement, i.e., perpendicular to the Y and Z axes, that is proportional to the rate of rotation $\vec{\Omega}$, and which is equal to twice the vector cross product of $\vec{V}$ with $\vec{\Omega}$, i.e., $\vec{\alpha} = 2 \vec{V} \times \vec{\Omega}$.

As those of some skill will appreciate, the velocity of the mass 1802 need not be constant in time or direction, but rather, can be harmonic, i.e., "vibratory," in nature. Thus, if the mass 1802 is driven harmonically, or "dithered," about a position, e.g., an operating position of the mass 1802, with a velocity of, e.g., $\vec{V} = \vec{V}o \sin \omega t$, the Coriolis acceleration $\vec{\alpha}$ becomes a harmonically varying function $\vec{\alpha} = 2 \vec{V} o \sin \omega t \times \vec{\Omega}$. The out-of-plane Coriolis acceleration α can then be detected or sensed by measuring the change in capacitance ΔC or electrostatic charge Δc detected at opposing electrodes (not illustrated) respectively mounted on lateral side surfaces of the mass 1702 and the support 1706, and the magnitude of $\vec{\Omega}$ can then be obtained by demodulating the foregoing relationship with the harmonic signal used to vibrate the mass 1802 using well known demodulation techniques. The resulting gyroscope or angular rate sensor is sometimes referred to as a "resonator" or "vibrating structure" gyroscope.

In order to sense rotation of the camera about the x axis (see FIG. 10), for example, the gyroscope can comprise a mass that is dithered along the optical path or z-axis. In this instance, the sensed Coriolis force will be along the y-axis. The sensed Coriolis force with be orthogonal to both the axis along which the mass is dithered and the axis about which the camera is being rotated.

According to an embodiment, a system of actuators that provide and/or sense motion both within a plane and out of the plane can be used for image stabilization. For example, a six degree of freedom actuator, such as that shown in FIGS. 10-14 can be used to implement image stabilization. Thus, the out-of-plane actuators 503 can cooperate to effect z-axis movement of the mass, e.g., to provide dithering. The in-plane actuators 502 can be used to sense the Coriolis force. Coriolis force resulting from a rotation about the x-axis can be sensed along the y-axis and vice versa.

Thus, the movement of the mass, e.g., the dithering, can be coupled from the dithering axis (the z-axis) to an in plane axis orthogonal to the z-axis, e.g., the x-axis or the y-axis, depending upon which axis the camera is rotated about. Rotation about the y-axis is couples motion into the x-axis, while rotation about the x-axis couples motions into the y-axis.

Generally, a small amount of dithering along the optical axis is acceptable. For example, the mass that is dithered can be that of a focusing lens. A value for the dithered displacement of the focusing lens can be selected that minimizes any adverse impact upon focus of the camera.

One or more embodiments can dither along other axes, such as for rotation sensing generally, e.g., for purposes other than image stabilization. One or more embodiments can use a system of actuation having other than six degrees of freedom. For example, other embodiments can use only in-plane actuators. Dither can be performed along any desired axis for sensing rotation about any desired axis.

Dithering can be an oscillation of the mass. Oscillation of the mass can be according to simple harmonic motion. Oscillation of the mass can be according to any other type of motion. Oscillation of the mass can be substantially linear, such as back and forth along a selected axis. Oscillation of the mass can be substantially non-linear, such as according to a rocking motion. Substantially linear oscillation of the mass can couple into substantially linear motion along an orthogonal axis. Substantially non-linear oscillation (e.g., rocking) of the mass can couple into substantially non-linear motion (e.g., rocking). Thus, linear dithering can couple into linear motion and rocking dithering can couple into rocking motion.

According to an embodiment, a gyroscope can be operated open loop. According to such open loop operation motion can build up (such as on the x-axis or the y-axis for dithering along the z-axis).

According to an embodiment, a gyroscope can be operated closed loop. According to such closed loop operation motion is not permitted to build up. Rather, a rebalance force is applied so as to null motion. The signal used to null the motion can be a sinusoidal signal at the dithering frequency. This signal can be used to produce an oscillating force that opposes continued movement of the mass such that motion is not allowed to build up as in open loop operation.

The mass can be any mass that can be moved via an actuator or via any other means. The mass can be a component of the camera, such as an optical element of the camera. For example, the mass can be a lens, such as a focusing lens, zoom lens, or any other lens. The mass can be any mass that can be acted upon by a Coriolis force, wherein the resultant movement or force can be sensed.

According to an embodiment, one or more optical components can be moved or translated within a plane (such as the x-y plane) that is perpendicular to the optical path (such as the z-axis) thereof. According to an embodiment, one or more optical components can be can be rotated about an axis (such as the x-axis or the y-axis). Such translation and/or rotation can be used to provide optical image stabilization, for example.

A resonator gyroscope and accelerometer capable of measuring angular rate around an axis perpendicular to an axis of rotation of a vibrating mass, plus linear accelerations along two axes perpendicular to the axis of rotation, is described in commonly owned U.S. Pat. No. 7,640,803 to R. Gutierrez et al., the entire disclosure of which is incorporated herein by reference.

Thus, the inertial sensor 1700 of FIG. 17 can be adapted to sense not only linear acceleration but the rotational or angular rate or velocity of the sensor $\dot{\theta}$ about an axis perpendicular to its axis of sensitivity by vibrating the mass 1702 about its null or operating position 1714, i.e., as indicated by the arcuate arrow 1720 in FIG. 17, at a frequency of $\omega t$ or $2\pi ft$, where f is, to obtain maximum sensitivity, preferably the lowest or fundamental resonance frequency of the spring-mass system 1704 and 1702 of the sensor 1700.

Figure 19:
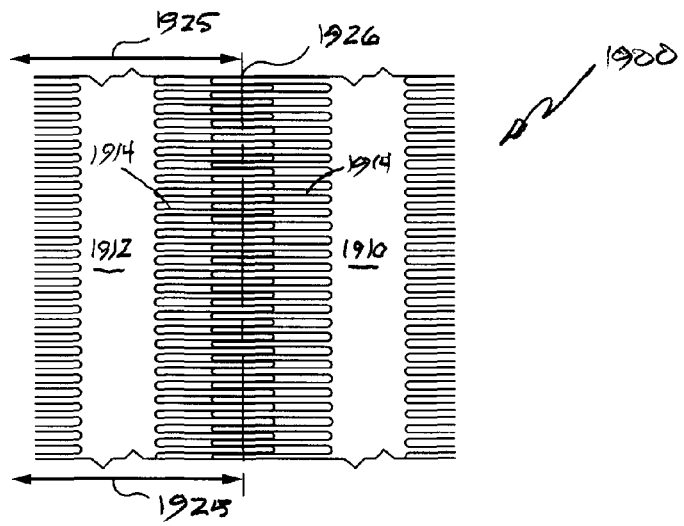
FIG. 19 is an enlarged partial plan view of the teeth of an in-plane comb-drive actuator.

FIG. 19 is an enlarged partial plan view of the interdigitated teeth 1914 of an in-plane comb-drive actuator 1900 of the type discussed above. As can be seen in FIG. 19, a differential voltage can be applied to respective ones of a fixed frame 1910 and a movable frame 1912 to cause the teeth 1914 of the moveable frame 1912 to move in the plane of the actuator to an operating position, as indicated by the phantom line 1926.

Thereafter, as discussed above in connection with FIG. 16, the differential voltage applied to the frames 1910 and 1912 can be used to position a mass, i.e., a moveable lens platform 1604 and an optical element mounted thereon, such as a lens 1602, rectilinearly along an axis parallel to the plane of the actuator device 1600. As further discussed above in connection with FIG. 16, in an actuator device 1600 incorporating, for example, three such in-plane actuators 1610 disposed at 120 degree angular intervals relative to each other, the device can effect three degrees of movement of the mass, viz., ±X, ±Y, and ±$\theta_Z$, that is, rectilinearly in a plane parallel to the plane of the frames 1910, 1912 and their associated teeth 1914, as well as rotationally about a Z axis normal to that plane.

Additionally, if the three actuators 1610 are driven harmonically with a given magnitude, frequency and relative phase relationship, then the platform-lens mass 1604-1602 can be driven harmonically in three different vibrational modes. For example, if the three actuators 1610 are driven in phase and at the same magnitude and frequency, the mass will vibrate rotationally about the Z axis. If the three actuators 1610 are driven in phase and at the same frequency, but with different magnitudes, the mass can be made to vibrate along any axis lying in the plane of the actuator device 1600. Finally, if the three actuators are driven at the same frequency and magnitude, but out of phase by 120 degrees, the mass can be made to oscillate in a circular path about the Z axis.

Thus, for example, as discussed above in connection with FIG. 17, if the frames 1910 and 1912 of the actuator 1910 are provided with appropriate sense electrodes and capacitance or charge pick-off terminals, and the moveable frame 1912 is harmonically vibrated about the operating position 1926 and relative to the fixed frame 1910 in the direction of the arrows 1925, a closed loop, force rebalance, differential capacitance, inertial sensor comprising gyroscopic and accelerometer functions is realized, viz., one which is capable of measuring linear acceleration $\vec{\alpha}$ along an axis in the plane of and parallel to the teeth 1914 of the actuators, and rotational velocity or angular rate of rotation $\dot{\theta}$ about an axis in the plane of and perpendicular to the teeth 1914.

Further, as illustrated in FIG. 16, in an actuator device 1600 incorporating three such in-plane actuators 1610 disposed at 120 degree angular intervals relative to each other, the output of each of the actuators 1610 can be combined vectorily so as to sense linear accelerations $\ddot{X}$ and $\ddot{Y}$ and angular rates $\dot{\theta}_X$ and $\dot{\theta}_Y$.

Figure 20A:
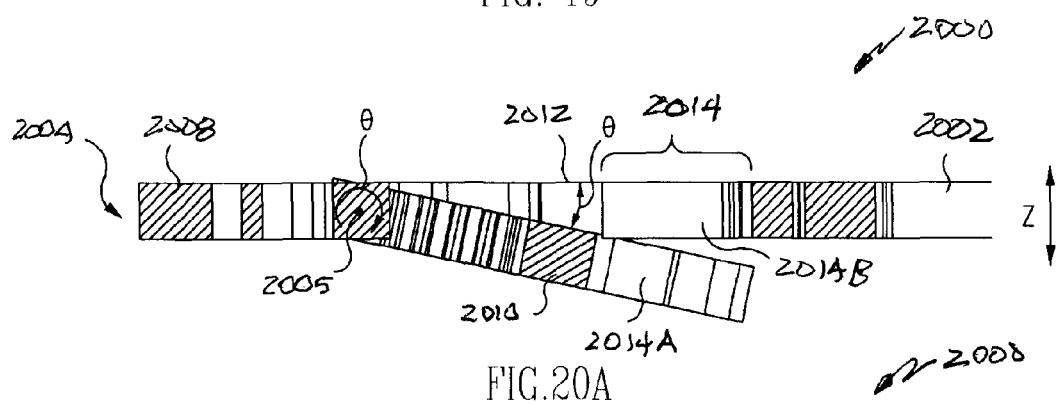
FIGS. 20A and 20B are partial cross-sectional elevation views of a deployed out-of-plane actuator device, respectively showing the device in an un-actuated state and a fully actuated state.
Figure 20B:
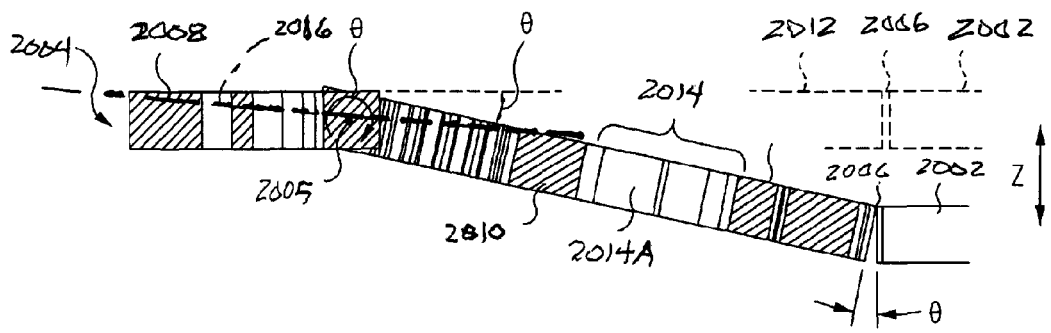

FIGS. 20A and 20B are partial cross-sectional elevation views of an out-of-plane actuator 2004 of a deployed out-of-plane actuator device 2000 of the type described above in connection with FIGS. 9A-9C, showing the device 2000 in an un-actuated state and a fully actuated state, respectively.

As can be seen in FIGS. 20A and 20B, when deployed, each actuator 2004 includes a portion, viz., a fixed frame 2010, that extends below, i.e., out of the plane of, the outer frame 2008 of the actuator device 2000. As described above, once deployed thus, the fixed frame 2010 can be fixed or locked into position such that it does not move further with respect to the outer frame 2008, and is angularly offset or "rotated" at an angle θ with respect to the associated moving frames 2612.

As illustrated in FIG. 20B, actuation of the actuator 2004, e.g., by application or removal of a voltage differential across the respective teeth 2014 of the fixed and moving frames 2010 and 2012, causes the movable frame 2012 to rotate down and toward, or up and away from, the deployed fixed frame 2010, respectively, about an axis 2005 in the plane of the actuator device 2000. Additionally, as in the case of the in-plane actuator 1900 described above, the application of a suitable bias voltage to the fixed and moving frames 2010 and 2012 will cause the moveable frame 2012 to rotate to an operating position, as indicated by the phantom line 2016 in FIG. 20B, i.e., to an intermediate angular position $\theta_1$, where $0<\theta_1<\theta$. Thereafter, rotation of the moveable frame 2612 about the axis 2605 and relative to the operating point 2016 will produce a corresponding downward rotation of a mass comprising the mounting platform 2002 and any optical element mounted thereon (not illustrated) about an axis lying in the plane of the actuator device 2000.

As discussed above in connection with FIG. 16, in an actuator device 1600 incorporating, for example, three such out-of-plane actuators 2004 disposed at 120 degree angular intervals relative to each other, the actuator device 1600 can effect three degrees of movement of the above mass, viz., ±Z, ±$\theta_X$, and ±$\theta_Y$, that is, rectilinearly along the Z axis and rotationally about the X and Y axes.

Additionally, if the three actuators 1610 are driven harmonically with a given magnitude, frequency and relative phase relationship, then the platform-lens mass 1604-1602 can be driven harmonically in three different vibrational modes. For example, if the three actuators 1610 are driven in phase and at the same magnitude and frequency, the mass will vibrate rectilinearly along the Z axis. If the three actuators 1610 are driven in phase and at the same frequency, but with different magnitudes, the mass can be made to rock harmonically about any axis lying in a plane parallel to the plane of the actuator device 1600. Finally, if the three actuators are driven at the same frequency and magnitude, but out of phase by 120 degrees, the mass can be made to wobble about the Z axis in a plane parallel to the plane of the actuator device 1600.

Thus, as discussed above in connection with FIG. 17, if the fixed and moving frames 2010 and 2012 of the actuators 2004 are provided with appropriate sense electrodes and capacitance or charge pick-off terminals, and the moveable frames 2012 are harmonically vibrated about their respective operating positions 2016 and relative to their respective fixed frames 2010, three, closed loop, force rebalance, differential capacitance, inertial sensors, each comprising gyroscopic and accelerometer functions, are realized, each of which is capable of measuring acceleration along an axis perpendicular to the plane of the actuator device 2000, i.e., $\ddot{Z}$ and an angular rate $\dot{\theta}$ about an axis in the plane of the actuator device 2000. Further, as above, the sense outputs each of the actuators 2004 can be combined vectorily so as to sense linear acceleration $\ddot{Z}$, and angular rates $\dot{\theta}_X$ and $\dot{\theta}_Y$.

Referring back to FIG. 16, as those of some skill in this art will by now understand from the above discussions regarding the utilization of in-plane and out-of-plane actuators to effect inertial sensing, if the actuators 1610 of the actuator device 1600 incorporate both in-plane and out-of-plane electrostatic comb drives, as discussed above in connection with the actuator device embodiments of FIGS. 10-14, it is possible to use the actuator device 1610 to both move and vibrate the mass comprising the platform 1604 and any payload disposed thereon, e.g., the lens 1602, in six degrees of movement, i.e., X, Y, Z, $\theta_X$, $\theta_Y$ and $\theta_Z$, and simultaneously, to measure the accelerations and angular rates acting on them in those same six degrees of movement, i.e., $\ddot{X}$, $\ddot{Y}$, $\ddot{Z}$, $\dot{\theta}_X$, $\dot{Z}_Y$ and $\dot{\theta}_Z$. Additionally, if the three actuators 1610 are driven harmonically with a given magnitude, frequency and relative phase relationship, then the platform-lens mass 1604-1602 can be driven harmonically in three different vibrational modes. For example, if the three actuators 1610 are driven in phase and at the same magnitude and frequency, the mass will vibrate rotationally about the Z axis. If the three actuators 1610 are driven in phase and at the same frequency, but with different magnitudes, the mass can be made to vibrate along any axis lying in the plane of the actuator device 1600. Finally, if the three actuators are driven at the same frequency and magnitude, but out of phase by 120 degrees, the mass can be made to oscillate in a circular path about the Z axis.

As an example of how an actuator module can function as a three accelerometer or "attitude sensor," FIG. 21 is a graph showing three plots of a measured capacitance C between adjacent comb drive actuator teeth of a camera module as a function of a force rebalance bias voltage $V_1$ applied to the teeth and an ambient gravity field acting on the module for each of a "neutral" gravity field (as indicated by the solid line), a "positive" gravity field (the dotted line), and a "negative" gravity field (the dashed line).

These plots might result, for example, from rotating the camera module from a position pointing straight up, in which gravity would tend to pull the platform and payload downward, i.e., −1 g, through an intermediate position, in which the module is pointed forward horizontally, i.e., "neutral" gravity, to a position in which the camera module is pointed straight down, i.e., +1 g. As can be seen in FIG. 21, a lower bias voltage is required to hold the teeth of the actuator in an initial or centered position when a negative gravity of −1 g is acting on the platform and payload, i.e., when the camera module is pointing straight up, while a higher bias voltage must be used when a positive gravity of +1 g is acting on the camera module, when compared with the bias voltage $V_1$ applied between actuator components to position the platform and lens with a selected tilt alignment (i.e., $\theta_x$ and $\theta_y$) and a selected centering alignment along the optical path of the camera module and with respect to an image sensor thereof. Based on the voltage applied to maintain the capacitance at $C_0$, the position of the camera module within the gravity field can be determined. Alternatively, the voltage can be fixed at a selected $V_1$ while the capacitance C is measured to determine the attitude of the module.

FIG. 22A illustrates a platform-mounted lens 10 supported by a plurality of flexures 12 being vibrated or "dithered" harmonically along a z-axis (i.e., one parallel to the optical axis of the lens 12) to generate an inertial frame and thereby achieve a gyroscopic function, as described above. FIG. 17B illustrates the lens 10 being vibrated along an x-axis and/or a y-axis (i.e., orthogonal to the optical axis of the lens 10) to generate an inertial frame and thereby achieve a gyroscopic function as described above. The various possible rotational movements of the lens 10 described above that can be obtained are not illustrated. As discussed above, by sensing a vibrational motion signal and demodulating it with the excitation signal, rotation or angular rate information is advantageously measured.

Figure 23:
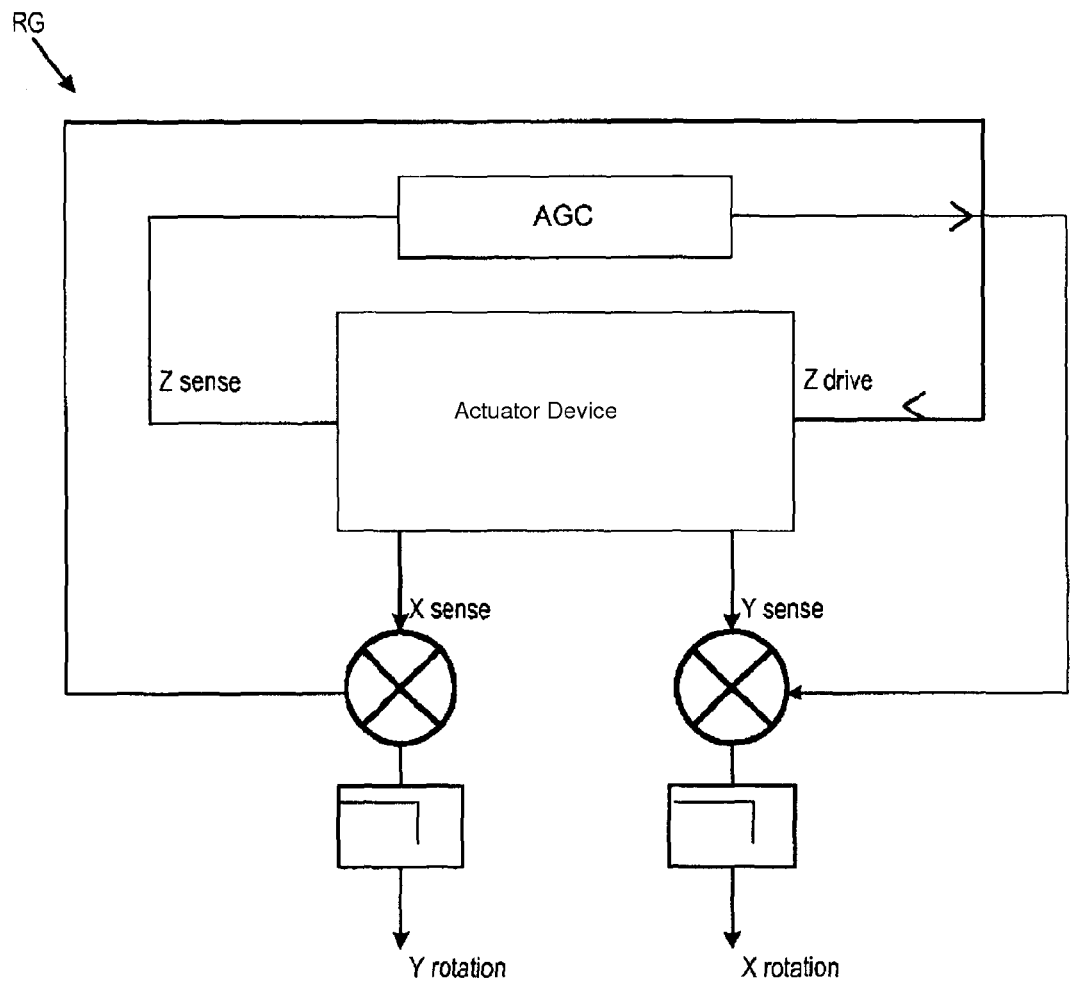
FIG. 23 is a functional block diagram of a feedback system for automatic gain control (AGC) of an actuator device being used as an inertial sensor in accordance with certain embodiments.

FIG. 23 is a functional block diagram of a closed loop force rebalance feedback control system 2300 for automatic gain control (AGC) of such a gyroscope in accordance with certain embodiments. A value of linear z motion adjusted by automatic gain control component 182, and a value of y motion are inputs to an x rotation component in the example of FIG. 23. A value of Z drive is input and a value of x sense are inputs to a y rotation component in the example of FIG. 23.

Figure 24:
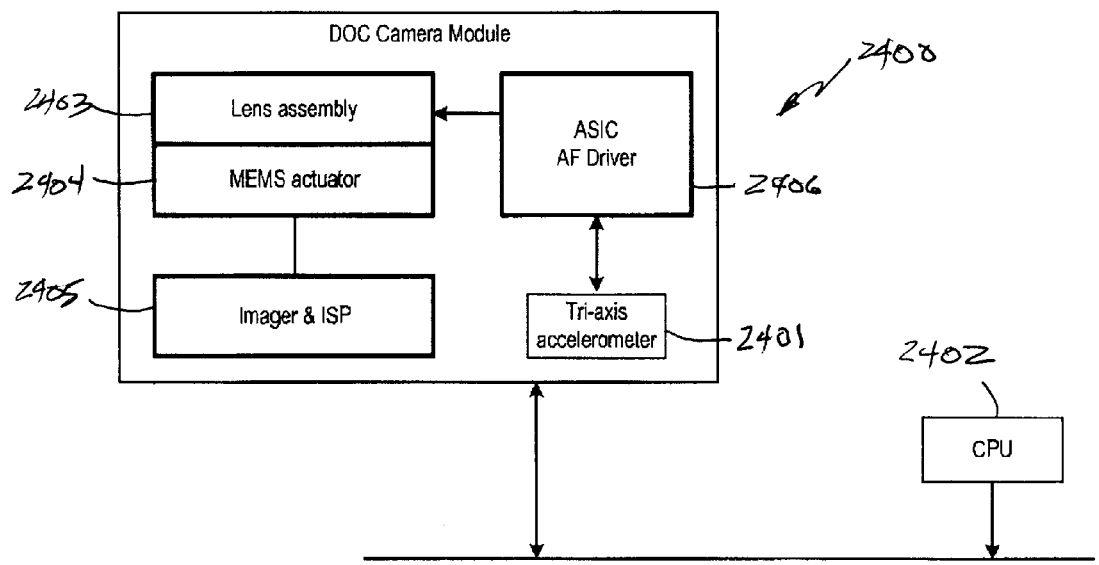
FIG. 24 is a functional block diagram of a miniature camera module coupled with an accelerometer and a processor in accordance with certain embodiments.

FIG. 24 is a functional block diagram of a miniature camera module 2400 incorporating a separate accelerometer 2401 and a processor 2402 in accordance with certain embodiments. The camera module 2400 of FIG. 24 also includes a lens assembly 2403, including a MEMS actuator device 2404 of the type described above, or alternatively, a voice coil motor or other type of actuator, for moving one or more lenses of the lens assembly 2003 in an autofocus and/or zoom operation. An imager or image sensor and an integrated image signal processor (ISP) 2405 are also included in the camera module 2400 of FIG. 24. The example camera module 2400 also includes an application specific integrated circuit (ASIC) auto-focus driver 2406 for rapid adjustment of the one or more lenses by the actuator 2404 in an auto-focus control operation. A closed loop feedback control system can be used to effect such operation, and auto-focus features may be included, as described for example, in commonly owned published U.S. Pat. App. Pub. Nos.: 2012/0075492, now U.S. Pat. No. 8,970,770, issued Mar. 3, 2015; 2012/0120283, now U.S. Pat. No. 8,648,959, issued Feb. 11, 2014; 2012/0120269, now U.S. Pat. No. 8,659,697, issued Feb. 25, 2014; 2012/0200725, now U.S. Pat. No. 8,508,652, issued Aug. 13, 2013; 2012/0249841, now U.S. Pat. No. 8,860,816, issued Oct. 14, 2014; and 2012/0250937, now U.S. Pat. No. 8,947,501, issued Feb. 3, 2015, the entire disclosure of each of which is incorporated herein by reference.

Figure 25:
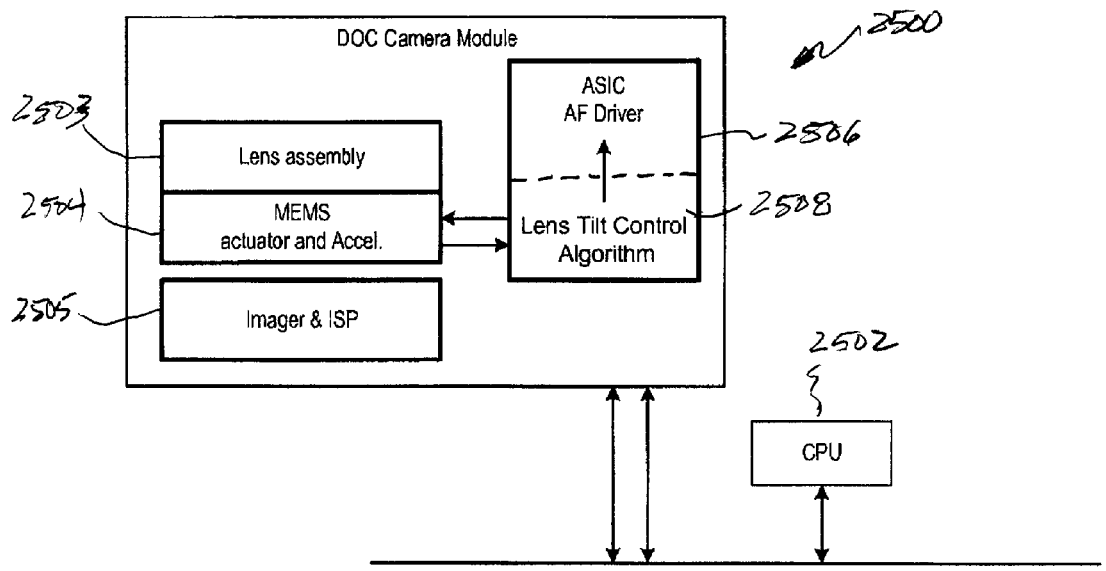
FIG. 25 is a functional block diagram of a miniature camera module utilizing actuator voltage inputs and capacitance measurements to effect an accelerometer functionality in the module.

FIG. 25 is a functional block diagram of a miniature camera module 2500 utilizing actuator 2504 voltage inputs and capacitance measurements as discussed above to effect an accelerometer functionality in the module 2500 without the need for a separate mechanical or physical accelerometer 2401 of the type described above in connection with FIG. 24. The camera module 2500 of FIG. 20 also includes a lens assembly 2503, including a MEMS actuator/accelerometer component 2404 for moving one or more lenses of the lens assembly 2503 in an autofocus and/or zoom operation, as well as acceleration and angular rate information. An imager or image sensor and integrated image signal processor (ISP) 2505 are also included in the camera module 2500.

The example camera module 2500 also includes an ASIC auto-focus driver 2506 for rapid adjustment of the one or more lenses by the actuator 2504 in an auto-focus control operation. A lens tilt control program 2508 stored in ASIC 2506 provides tilt alignment of the lens assembly 2503 utilizing the example closed loop control process described within in connection with FIG. 23 above. Advantageously, the camera module 2500 of FIG. 25 has an accelerometer functionality utilizing capacitance and/or bias voltage information that, as discussed above, is already available without the use or inclusion of a separate accelerometer component. A camera-enabled host device (e.g., a camera phone, digital camera or web cam) that incorporates the camera module 2500 of FIG. 25 can also utilize the accelerometer functionality without the need for a separate accelerometer in the host device.

Figure 26:
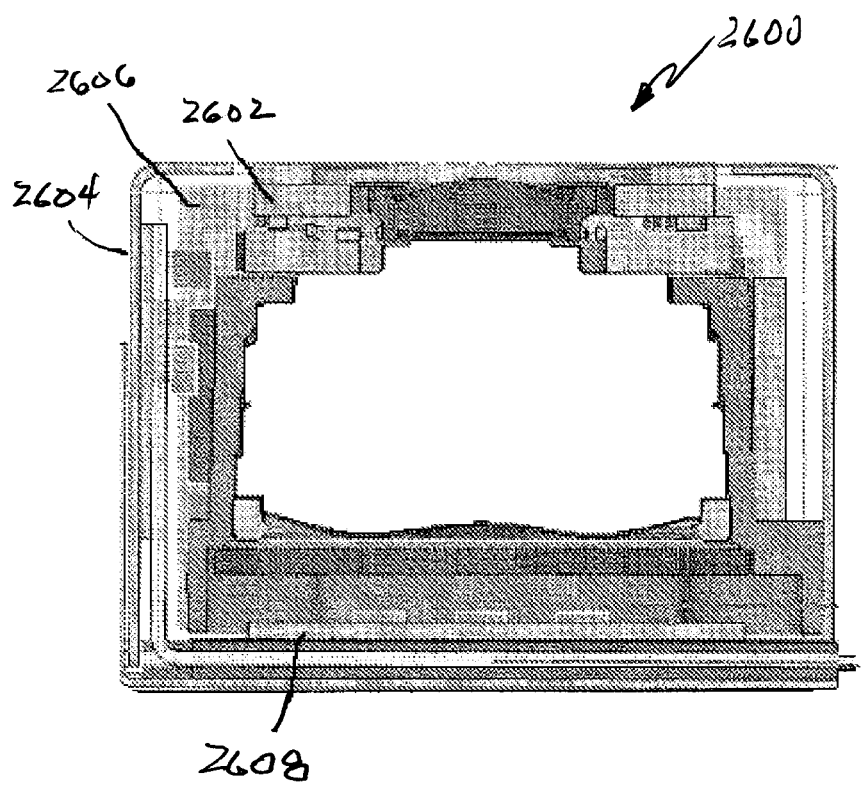
FIG. 26 is a cross-sectional elevation view of an example embodiment of a miniature camera module in accordance with the present invention, wherein lenses of the module have been omitted for purposes of illustration.

FIG. 26 is a cross-sectional elevation view of an example embodiment of a miniature camera module 2600 in accordance with the present invention, wherein lenses of the module 2500 have been omitted for purposes of illustration. A lens barrel 2602 and an EMI shield 2604 are snugged together with a spacer filler 2606 disposed between them. The lens barrel 2602 is shown disposed over an image sensor 2608 and contains lenses (not shown) for focusing scenes onto the image sensor 2608 for capturing digital images of the scenes.

Figure 27A:
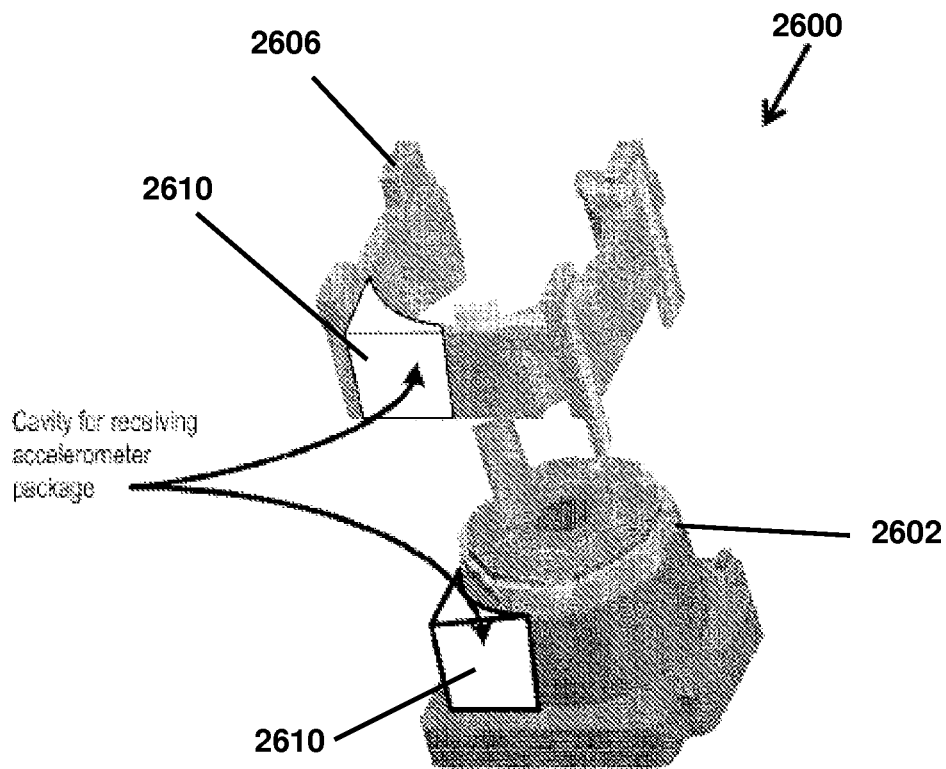
FIG. 27A is an exploded top and side perspective view of the example miniature camera module of FIG. 26, showing a lens barrel, accelerometer package, and spacing filler component having a cavity configured to receive the accelerometer package thereof.

FIG. 27A is an exploded top and side perspective view of the example miniature camera module 2600 of FIG. 26, showing the lens barrel 2602, a cavity 2610 configured to receive a separate accelerometer, and the spacing filler 2606 incorporating the cavity 2610. Similar to the embodiment illustrated in FIG. 21, the camera module 210 has a built-in accelerometer. Advantageously, a camera phone or other camera-enabled device that includes the camera module 2600 of FIGS. 26 and 27A can utilize the functionality of the separate accelerometer in the module 2600 without including a separate accelerometer, other than that provided by the camera module 2600 itself.

Moreover, it may be noted that the camera module 2600 does not increase in size due to the provision of the accelerometer functionality because, in this example embodiment, the spacer filler 2606 can be removed (i.e., removed from a camera module 2600 either (i) not including an accelerometer feature or (ii) using the capacitance-voltage information to provide accelerometer functionality, as in the example embodiments described above) to accommodate the accelerometer. The outer dimension of the housing of the camera module 2600 is thus not increased in size due to the addition of the components of camera module 2600 illustrated in FIGS. 26 and 27A. The same is true for the embodiment of FIGS. 24 and 25.

Figure 27B:
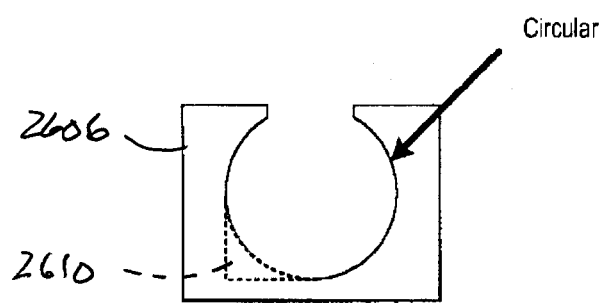
FIG. 27B is a bottom plan view of the example spacing filler component of FIG. 27A.

FIG. 27B is a bottom plan view of the example spacing filler component 2606 of FIG. 22A. The spacer filler component 2606 has a cavity 2610 that matches the configuration of the separate accelerometer package illustrated in the example embodiment of FIG. 27A.

Figures 28A, 28B:
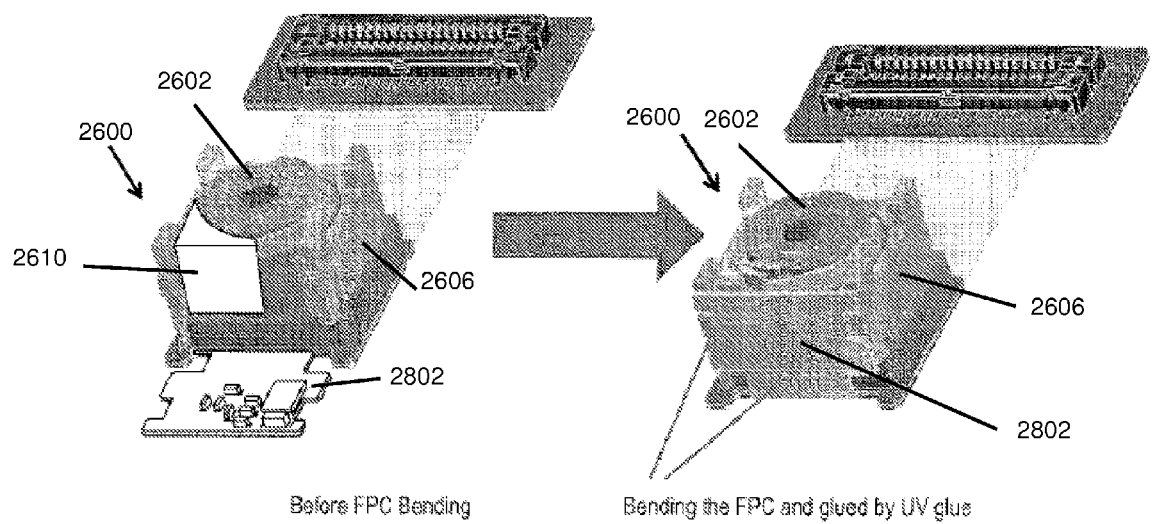
FIGS. 28A and 28B are top and side perspective views of the example miniature camera module coupled to a flexible printed circuit (FPC), shown before and after bending of the FPC, respectively.

FIGS. 28A and 28B are top and side perspective views of the example miniature camera module 2600 coupled to a flexible printed circuit (FPC) 2802, shown before and after a bending operation of the FPC 2802, respectively. The space on the opposite side of the lens barrel 2602 from the cavity 2610 can also be used by a passive component electrically coupled to the FPC 2802 as it protrudes into the corner space of the rectangular camera module 2600 that is not otherwise filled by the cylindrical lens barrel 2602. As many as all four of the corner spaces of the camera module 2600 outside of the lens barrel 2602 can advantageously be filled with passive or active electrical components. Alternatively, the corner spaces of the camera module 2600 can be eliminated to reduce the size of the camera module 2600 or to shape the camera module 2600 to fit within a specific space of a host device.

Figure 29:
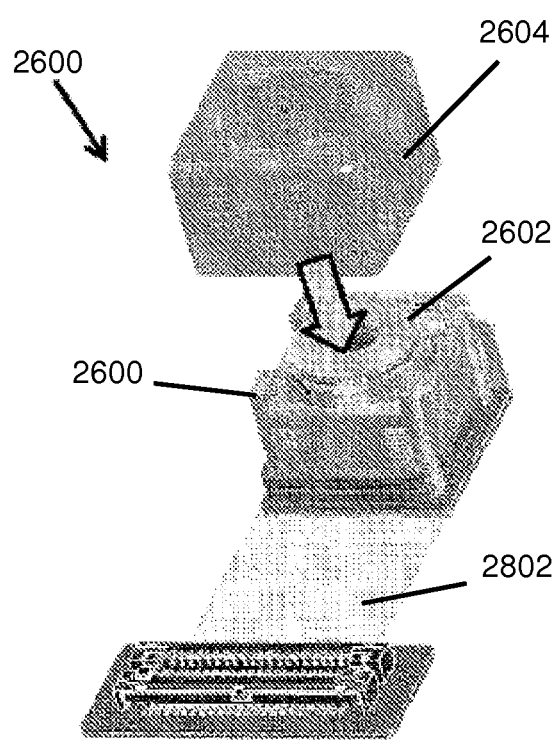
FIG. 29 is a top and side exploded perspective view of the miniature camera module, showing an EMI shield for covering an assembled version of the camera module components of FIG. 22A.

FIG. 29 is an exploded top and side perspective view of the miniature camera module 2600, showing the EMI shield 2604 for covering the components of an assembled version of the camera module 210 of FIG. 22A.

Figure 30:
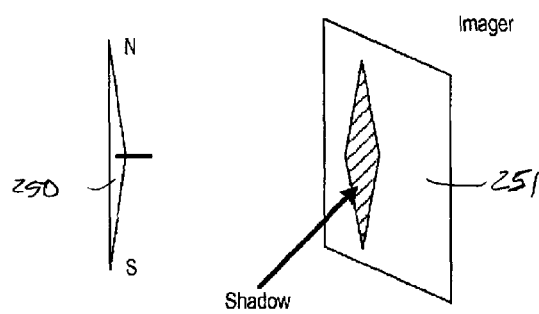
FIG. 30 is a diagram illustrating an image of a shadow cast by a suspended magnet on an imager being used for orientation of the imager in accordance with certain embodiments.

FIG. 30 is a diagram illustrating an image of a shadow cast by a suspended magnet 250 on an imager 251 being used for orientation of the imager 251 in accordance with certain embodiments. The imager 251 can then provide information as to the orientation of the imager 251 relative to a magnetic field in accordance with certain embodiments.

Figure 31A:
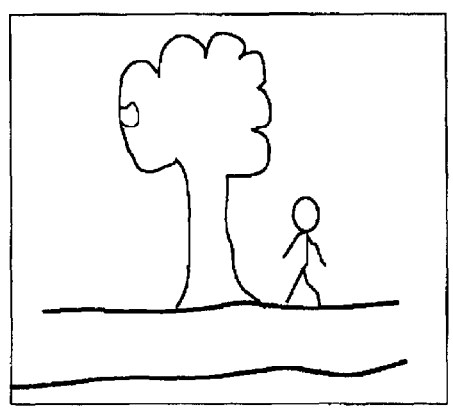
FIGS. 31A and 31B respectively illustrate images of a scene captured at two different orientations of a miniature camera module.
Figure 31B:
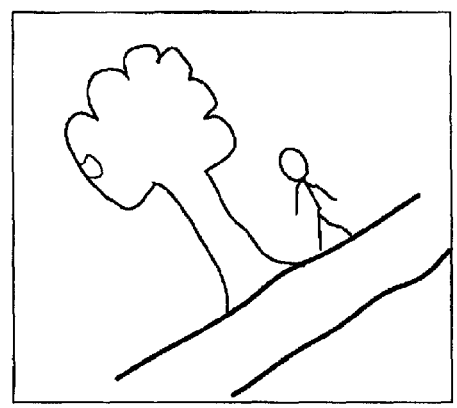

FIGS. 31A and 31B respectively illustrate images of a scene captured at two different angular orientations of a miniature camera module of the type described above.

Figure 32:
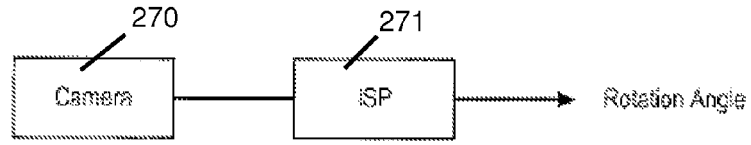
FIG. 32 is functional block diagram of a camera and image signal processor (ISP) that compensates for a rotation angle of the camera.
Figure 33:
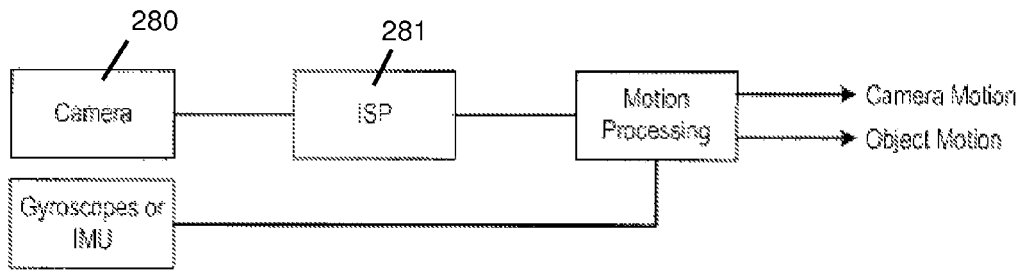
FIG. 33 is a functional block diagram of a camera and ISP that compensates for both movement of the camera and movement of an object imaged by the camera in accordance with certain embodiments.

FIG. 32 is a functional block diagram of a camera 270 and an image signal processor (ISP) 271 that compensates for the rotational angle of the camera 270. FIG. 38 is a functional block diagram of a camera 280 and an ISP 281 that compensates for both movement of the camera 280 and movement of an object being imaged by the camera 280 in accordance with certain embodiments. Features such as those described above are disclosed in, e.g., commonly owned U.S. Pat. App. Pub. Nos.: 2012/0206617, now U.S. Pat. No. 8,587,665, issued Nov. 19, 2013; 2012/0207347, now U.S. Pat. No. 8,705,894, issued Apr. 22, 2014; and 2012/0206618, now U.S. Pat. No. 8,587,666, issued Nov. 19, 2013, the entire disclosure of each of which is incorporated herein by reference, and can also be used in alternative embodiments to register images captured that have global or local rotation between them and/or to discern the motion of the camera and/or one or more objects in a captured scene.

Figure 34:
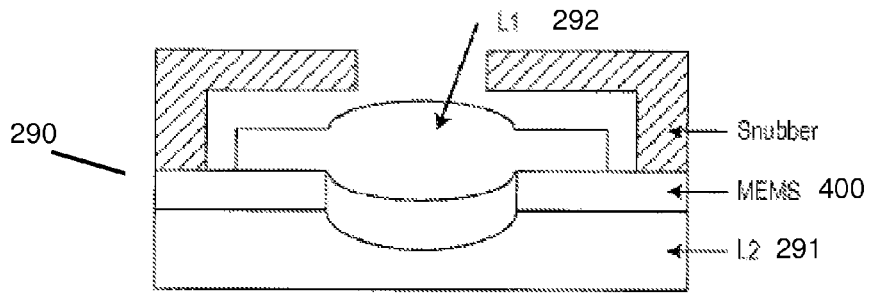
FIG. 34 is a cross-sectional side elevation view of an optical train of an example miniature camera module, showing a second lens of the optical train being used as a snubber for an actuator that moves a first lens of the optical train.

FIG. 34 is a cross-sectional side elevation view of an optical train 290 of an example miniature camera module, showing a second lens 291 of the optical train 290 being used as a "snubber" for an actuator device 400 that is configured to move a first lens 292 of the optical train 290.

Figure 35:
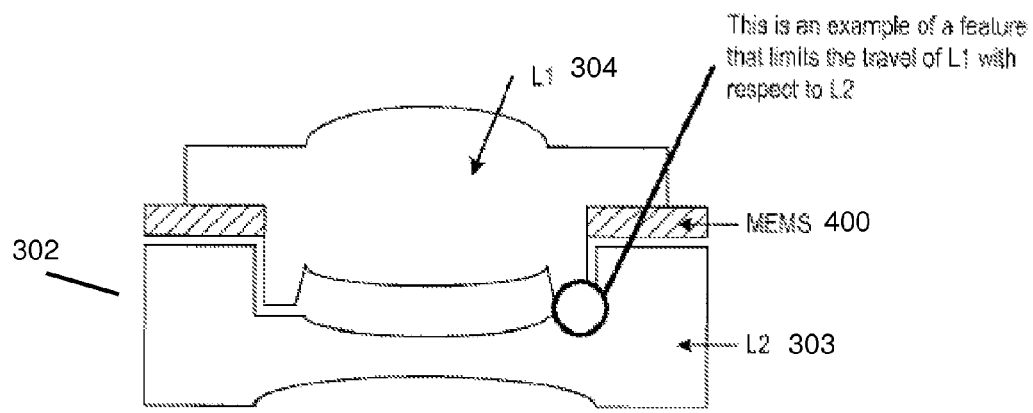
FIG. 35 is a cross-sectional side elevation view of an optical train of another example miniature camera module, showing a second lens of the optical train being used as a snubber for an actuator that moves a first lens of the optical train.

FIG. 35 is a cross-sectional side elevation view of an optical train 302 of another example miniature camera module, showing a second lens 303 of the optical train 302 being used as a snubber for an actuator device 400 that moves a first lens 304 of the optical train 302.

While example drawings and embodiments of the present invention have been described and illustrated herein, it should be understood that that the scope of the present invention is not to be limited to the particular example embodiments discussed. Thus, these embodiments should be regarded as illustrative rather than restrictive, and it should be understood that many variations can be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

What is claimed is:

1. A camera module, comprising:
   an accelerometer configured to measure an acceleration acting on the camera module and to provide information for aligning an optical component of an optical train of the camera module with respect to an optical path of the camera module in accordance with the information; and a generally planar actuator coupled to a stage mounting one or more lenses of the optical train, the actuator being configured to move the one or more lenses in accordance with the information and to provide zoom, autofocus or both zoom and autofocus functions of the camera module, wherein the actuator comprises an out-of-plane portion operable to apply a force acting perpendicular to a plane of the actuator and the stage when actuated, the out-of-plane portion including an out-of-plane fixed frame and an out-of-plane moving frame coupled to the stage and resiliently supported for rotational movement relative to the out-of-plane fixed frame.

2. The camera module of claim 1, further comprising: a camera module housing defining an aperture and an internal cavity for accommodating camera module components.

3. The camera module of claim 2, wherein the housing comprises an EMI shield.

4. The camera module of claim 1, further comprising: an image sensor and wherein the accelerometer is configured to measure an inertial force acting upon the optical component with respect to the image sensor.

5. The camera module of claim 1, further comprising: a lens barrel containing the optical train and disposed relative to an aperture and an image sensor of the camera.

6. The camera module of claim 5, wherein the accelerometer is disposed outside of the lens barrel.

7. The camera module of claim 1, further comprising: an electromagnetic interference (EMI) shield surrounding one or more components of the camera module.

8. The camera module of claim 1, wherein the actuator is coupled to an outer periphery of the stage by one or more resilient flexures for both in-plane and out-of-plane movement of the stage relative to a plane that is normal to the optical path.

9. The camera module of claim L wherein the actuator comprises an in-plane portion operable to apply a force acting in the plane of the device and tangentially to the stage when actuated, the in-plane portion including an in-plane fixed frame and an in-plane moving frame coupled to the out-of-plane fixed frame and resiliently supported for translational movement relative to the in-plane fixed frame.

10. The camera module of claim 9, further comprising: an outer frame surrounding and supporting the stage and the actuator, wherein either the out-of-plane fixed frame or the out-of-plane moving frame is rotated to a deployed position disposed at a selected angular position relative to the other out-of-plane frame, the in-plane moving frame is translated to a deployed position that is coplanar with and spaced at a selected distance apart from the in-plane fixed frame, and the out-of-plane and in-plane frames are fixed at their respective deployed positions.

11. The camera module of claim 1, wherein the actuator comprises an in-plane portion operable to apply a force acting in the plane of the device and tangentially to the stage when actuated, the in-plane portion including an in-plane fixed frame and an in-plane moving frame coupled to the out-of-plane fixed frame by one or more resilient flexures for translational movement of the in-plane moving frame relative to the in-plane fixed frame.

12. The camera module of claim 1, wherein the actuator comprises:
an outer frame;
a fixed frame attached to the outer frame; and
a moveable frame configured to be disposed at a deployed position approximately parallel to the fixed frame and spaced apart from the fixed frame at a selected distance and for approximately rectilinear, perpendicular movement relative thereto.

13. The camera module of claim 12, further comprising: a deployment lever engaged with an over-center latch configured to latch the moveable frame in the deployed position.

14. The camera module of claim 1, wherein the actuator comprises:
an outer frame;
a fixed frame attached to the outer frame;
a moveable frame disposed approximately parallel to the fixed frame; and
a motion control flexure coupled to both the moveable frame and to the outer frame such that the moveable frame is moveable rectilinearly relative to the outer frame and the fixed frame.

15. A camera module, comprising:
a camera module housing defining an aperture and an internal cavity to accommodate camera module components;
a processor;
an image sensor coupled to or within the housing;
a lens barrel disposed within the housing, the lens barrel containing an optical train disposed relative to the aperture and image sensor to focus images of scenes onto the image sensor along an optical path; and
an actuator coupled to one or more lenses of the optical train and configured to move the one or more lenses relative to the image sensor to provide zoom, autofocus or both zoom and autofocus functions, wherein
the actuator comprises an outer frame, a fixed frame attached to the outer frame, and a moveable frame configured to be disposed at a deployed position approximately parallel to the fixed frame and spaced apart from the fixed frame at a selected distance and for approximately rectilinear, perpendicular movement relative thereto,
the actuator is configured to position one or more lenses of the optical train by applying one or more bias voltages respectively between one or more pairs of actuator components, and
the processor is configured to measure one or more capacitances of the one or more pairs of actuator components and to calculate an acceleration or inertial force acting on the camera module based on the one or more bias voltages and the one or more measured capacitances and to provide information for the actuator to align the optical train along the optical path in accordance with the information.

16. The camera module of claim 15, wherein the actuator is coupled to an outer periphery of a stage resiliently supported for both in-plane and out-of-plane movement relative to a plane that is normal to the optical path.

17. The camera module of claim 15, further comprising: a deployment lever engaged with an over-center latch configured to latch the moveable frame in the deployed position.

18. The camera module of claim 15, wherein the actuator comprises:
an outer frame;
a fixed frame coupled to the outer frame;
a moveable frame disposed approximately parallel to the fixed frame; and
a motion control flexure coupled to both the moveable frame and to the outer frame such that the moveable frame is moveable rectilinearly relative to the outer frame and the fixed frame.

19. The camera module of claim 15, wherein the information provided according to the one or more measured capacitances is used by the processor to calculate one or more values used to align the optical train along the optical path with respect to tilt alignment.

20. The camera module of claim 15, wherein the information provided according to the one or more measured capacitances is used by the processor to calculate one or more values used to align the optical train along the optical path with respect to centering alignment.

21. The camera module of claim 15, wherein the information provided according to the one or more measured capacitances is used by the processor to calculate one or more values used to align the optical train along the optical path with respect to both tilt and centering alignment.

22. A camera module, comprising:
a camera module housing defining an aperture and an internal cavity to accommodate camera module components;
a processor;
an image sensor coupled to or disposed within the housing;
a lens barrel disposed within the housing and containing an optical train that is disposed relative to the aperture and image sensor to focus images of scenes onto the image sensor along an optical path; and
an actuator coupled to one or more lenses of the optical train and configured to move the one or more lenses relative to the image sensor to provide zoom, autofocus or both zoom and autofocus functions, wherein
the actuator comprises an outer frame, a fixed frame attached to the outer frame, and a moveable frame configured to be disposed at a deployed position approximately parallel to the fixed frame and spaced apart from the fixed frame at a selected distance and for approximately rectilinear, perpendicular movement relative thereto, and
the actuator is configured to bias one or more pairs of actuator components, to measure one or more capacitances of the one or more pairs of actuator components, to calculate an acceleration or force acting on the camera module based on the one or more measured capacitances, and to provide information for the actuator to align the optical train along the optical path in accordance with the information.

23. The camera module of claim 22, wherein the information provided according to the one or more measured capacitances is used by the processor to calculate one or more values used to align the optical train along the optical path with respect to tilt alignment.

24. The camera module of claim 22, wherein the information provided according to the one or more measured capacitances is used by the processor to calculate one or more values used to align the optical train along the optical path with respect to centering alignment.

25. The camera module of claim 22, wherein the one or more pairs of actuator components comprise at least two pairs of components.

26. The camera module of claim 22, wherein the one or more pairs of actuator components comprise at least three pairs of components.

* * * * *